(12) United States Patent
Lim et al.

(10) Patent No.: US 12,188,533 B2
(45) Date of Patent: Jan. 7, 2025

(54) DISC BRAKE AND COVER COMPONENT

(71) Applicant: Hitachi Astemo, Ltd., Ibaraki (JP)

(72) Inventors: Khai Piau Lim, Hitachinaka (JP);
Shinji Suzuki, Hitachinaka (JP)

(73) Assignee: Hitachi Astemo, Ltd., Ibaraki (JP)

( * ) Notice: Subject to any disclaimer, the term of this patent is extended or adjusted under 35 U.S.C. 154(b) by 393 days.

(21) Appl. No.: 17/785,101

(22) PCT Filed: Dec. 10, 2020

(86) PCT No.: PCT/JP2020/046108
§ 371 (c)(1),
(2) Date: Jun. 14, 2022

(87) PCT Pub. No.: WO2021/125052
PCT Pub. Date: Jun. 24, 2021

(65) Prior Publication Data
US 2023/0025307 A1  Jan. 26, 2023

(30) Foreign Application Priority Data

Dec. 18, 2019  (JP) ................. 2019-228246

(51) Int. Cl.
*F16D 55/226* (2006.01)
*F16D 65/00* (2006.01)
*F16D 55/00* (2006.01)

(52) U.S. Cl.
CPC ....... *F16D 65/0081* (2013.01); *F16D 55/226* (2013.01); *F16D 65/0075* (2013.01); *F16D 2055/002* (2013.01); *F16D 2055/0037* (2013.01)

(58) Field of Classification Search
CPC .................................................. F16D 65/0081
See application file for complete search history.

(56) References Cited

U.S. PATENT DOCUMENTS 9,267,557 B2 * 2/2016 Boyle ................... F16D 55/227
10,378,597 B2   8/2019 Hyeok
2010/0163350 A1  7/2010 Uwe et al.

FOREIGN PATENT DOCUMENTS

DE  4101514 A1  7/1992
JP  7-259902 A  10/1995
(Continued)

OTHER PUBLICATIONS

WO2020128228 machine translation (Year: 2020).*
(Continued)

*Primary Examiner* — Melanie Torres Williams
(74) *Attorney, Agent, or Firm* — Mattingly & Malur, PC

(57) ABSTRACT

This disc brake includes a mounting member, a pair of brake pads, a caliper, a cover member, and a locking member. The caliper includes a cylinder part having a cylinder hole in which a piston for moving one of the pair of brake pads is disposed, a bridge part extending across an outer circumferential surface of a disc from the cylinder part, a plurality of claw parts formed on an extended distal end side of the bridge part and disposed to face the cylinder part, and a recessed part provided between the plurality of claw parts, having an opening at a disc radial direction inner end, and formed to face the cylinder hole. The locking member includes a fixing part fixed to the cover member, and a plurality of locking pieces extending from the fixing part in a direction inclined with respect to a movement direction of the piston.

20 Claims, 19 Drawing Sheets

(56) References Cited

FOREIGN PATENT DOCUMENTS

| JP | 2010-510459 A | 4/2010 | |
|---|---|---|---|
| JP | 5332014 B2 | 11/2013 | |
| WO | WO-2020128228 A1 * | 6/2020 | ............. F16D 55/22 |

OTHER PUBLICATIONS

Japanese Office Action received in corresponding Japanese Application No. 2023-071460 dated Jan. 30, 2024.
International Search Report received in corresponding International Application No. PCT/JP2020/046108 dated Jan. 26, 2021.
Written Opinion received in corresponding International Application No. PCT/JP2020/046108 dated Jan. 26, 2021.

* cited by examiner

DISC BRAKE AND COVER COMPONENT

TECHNICAL FIELD

The present invention relates to a disc brake and a cover component.

Priority is claimed on Japanese Patent Application No. 2019-228246 filed on Dec. 18, 2019, the content of which is incorporated herein by reference.

BACKGROUND ART

Among disc brakes, there is one having a cover component mounted on a portion of a caliper that is visible from the outside of a vehicle (see, for example, Patent Literature 1).

CITATION LIST

Patent Literature

Patent Literature 1

German Unexamined Patent Application, First Publication No. 4101514

SUMMARY OF INVENTION

Technical Problem

Assembly of a cover component to a caliper is desired to be facilitated.

An objective of the present invention is to provide a disc brake and a cover component in which assembly of a cover component to a caliper is facilitated.

Solution to Problem

In order to achieve the above-described objective, the present invention employs the following aspects. A first aspect is a disc brake that brakes a vehicle having a disc rotating together with a wheel and includes a mounting member mounted on a non-rotating portion of the vehicle, a pair of brake pads, a caliper provided on the mounting member to be movable and configured to press the pair of brake pads against the disc, a cover member covering a recessed part of the caliper, and a locking member provided separately from the cover member and configured to fix the cover member to the caliper, in which the caliper includes a cylinder part having a cylinder hole in which a piston for moving one of the pair of brake pads is disposed, a bridge part extending across an outer circumferential surface of the disc from the cylinder part, a plurality of claw parts formed on an extended distal end side of the bridge part and disposed to face the cylinder part, and the recessed part provided between the plurality of claw parts, having an opening at a disc radial direction inner end, and formed to face the cylinder hole, and the locking member includes a fixing part fixed to the cover member, and a plurality of locking pieces extending from the fixing part in a direction inclined with respect to a movement direction of the piston to come into contact with an inner surface of the recessed part with an elastic force.

Also, a second aspect is a cover component constituting a disc brake which includes a mounting member mounted on a non-rotating portion of a vehicle having a wheel and a disc which rotates with the wheel, a pair of brake pads, and a caliper provided on the mounting member to be movable and configured to press the pair of brake pads against the disc, in which the caliper includes a cylinder part having a cylinder hole in which a piston for moving one of the pair of brake pads is disposed, a bridge part extending across an outer circumferential surface of the disc from the cylinder part, a plurality of claw parts formed on an extended distal end side of the bridge part and disposed to face the cylinder part, and a recessed part provided between the plurality of claw parts, having an opening at a disc radial direction inner end, and formed to face the cylinder hole, and the cover component includes a cover member covering the recessed part, and a locking member provided separately from the cover member and configured to fix the cover member to the caliper, in which the locking member includes a fixing part fixed to the cover member, and a plurality of locking pieces extending from the fixing part in a direction inclined with respect to a movement direction of the piston to come into contact with an inner surface of the recessed part with an elastic force.

Advantageous Effects of Invention

According to the above-described aspects of the present invention, assembly of the cover component to the caliper is facilitated.

DESCRIPTION OF EMBODIMENTS

An embodiment of the present invention will be described below with reference to the drawings.

Figure 1:
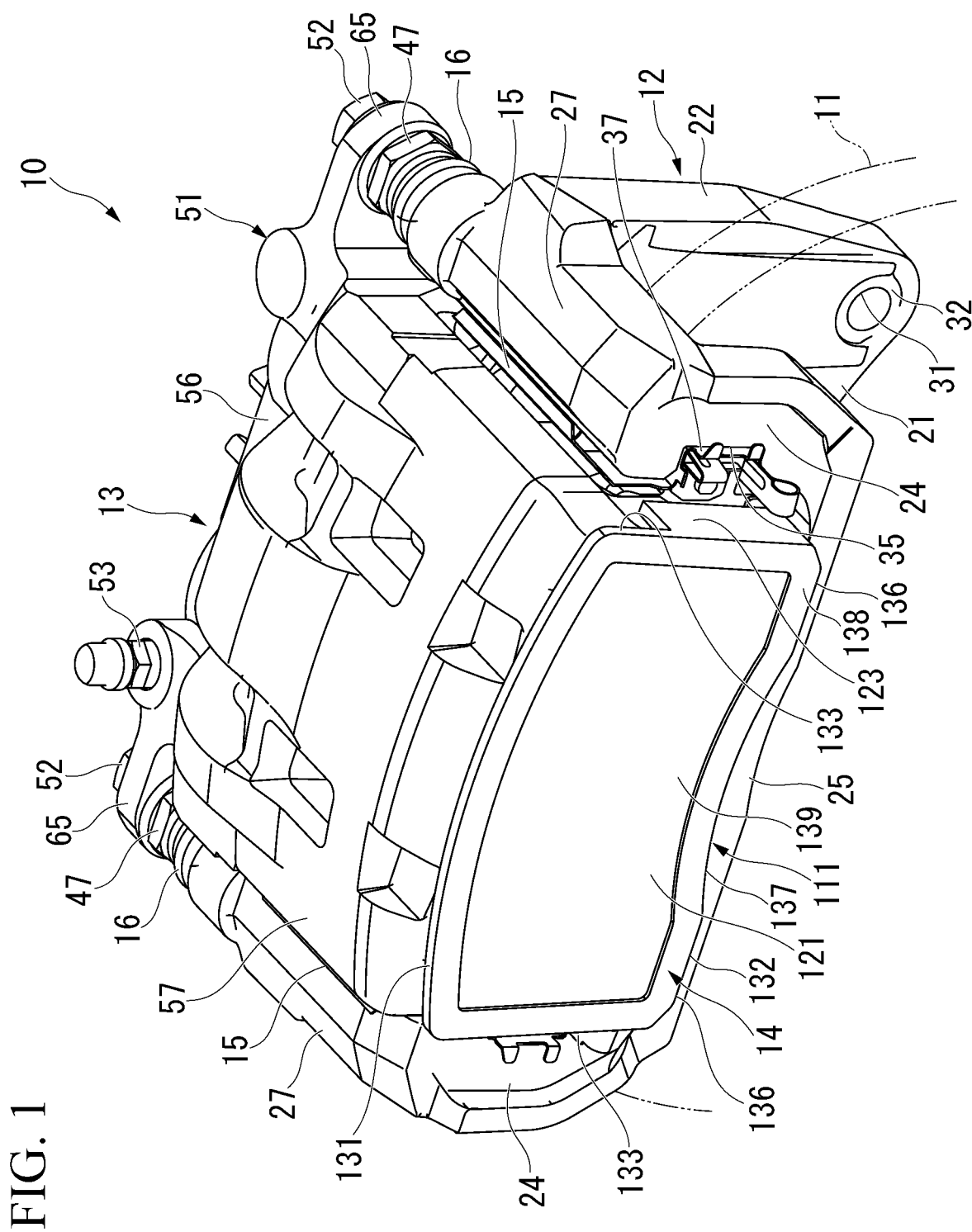
FIG. 1 is a perspective view illustrating a disc brake according to one embodiment of the present invention.
Figure 2:
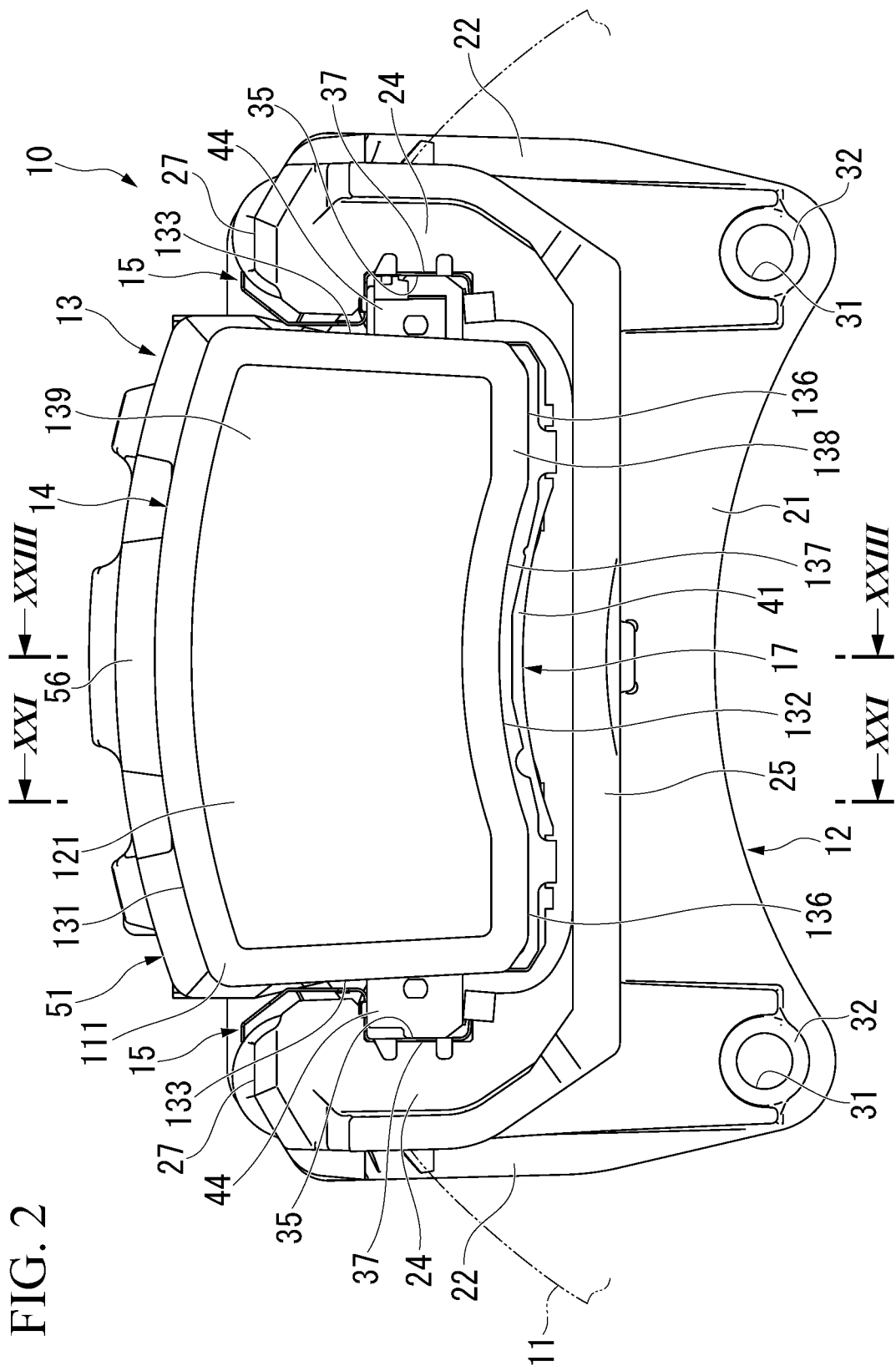
FIG. 2 is a front view illustrating the disc brake of the embodiment.

A disc brake 10 of the present embodiment is for a vehicle such as an automobile, applies a braking force to the vehicle, and specifically, is for front wheel braking of a four-wheeled vehicle. As illustrated in FIGS. 1 and 2, the disc brake 10 brakes the vehicle by stopping rotation of a disc-shaped disc 11 that rotates together with a wheel (not illustrated). Hereinafter, a direction of a central axis of the disc 11 is referred to as a disc axial direction, a radial direction of the disc 11 is referred to as a disc radial direction, and a rotation direction of the disc 11, that is, a circumferential direction thereof, is referred to as a disc rotation direction. Also, a center side of the disc 11 in the disc radial direction is referred to as a disc radial direction inner side, and a side opposite to the center of the disc 11 in the disc radial direction is referred to as a disc radial direction outer side.

Figure 3:
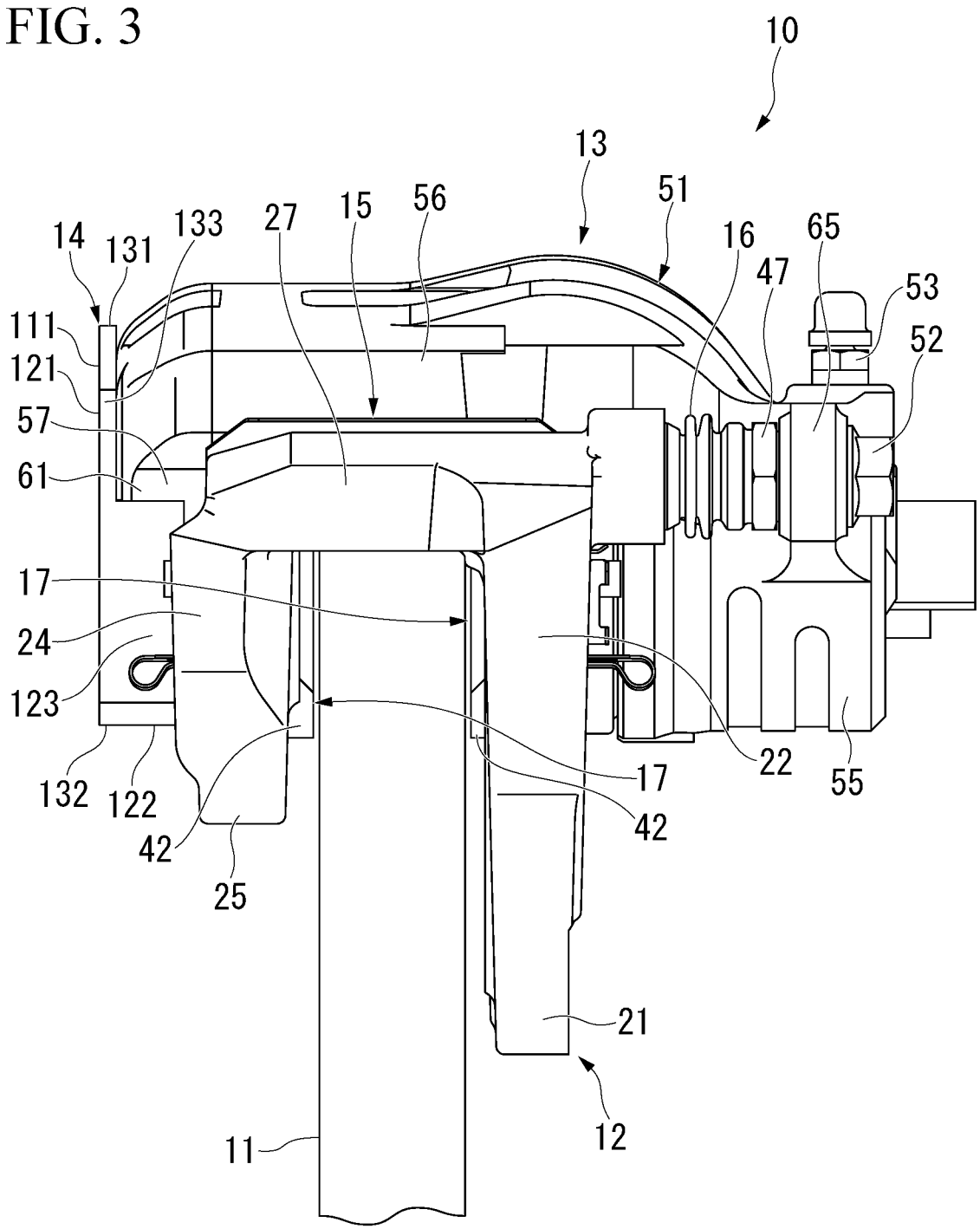
FIG. 3 is a plan view illustrating the disc brake of the embodiment.

As illustrated in FIGS. 1 and 2, the disc brake 10 includes a mounting member 12, a caliper 13, a cover component 14, a pair of pad springs 15, and a pair of boots 16. Also, as illustrated in FIG. 3, the disc brake 10 includes a pair of brake pads 17.

As illustrated in FIG. 2, the mounting member 12 includes an inner beam part 21, a pair of inner pad support parts 22, a pair of outer pad support parts 24, and an outer beam part 25. As illustrated in FIG. 1, the mounting member 12 includes a pair of pin insertion parts 27. The mounting member 12 is a casting that is integrally formed by casting, and has a mirror-symmetrical shape with respect to a center in the disc rotation direction.

As illustrated in FIG. 1, the inner beam part 21 is disposed on one side in the disc axial direction with respect to the disc 11 and is attached to a non-rotating portion of the vehicle. Here, the non-rotating portion of the vehicle on which the mounting member 12 is mounted is disposed on an inner side in a vehicle width direction, that is, on an inner side with respect to the disc 11. The inner beam part 21 attached to the non-rotating portion is also disposed on the inner side with respect to the disc 11. As illustrated in FIG. 2, the inner beam part 21 is disposed to extend in the disc rotation direction and includes a pair of attachment boss parts 32 each having attachment hole 31 at portions on both sides in the disc rotation direction. The inner beam part 21 is attached to the non-rotating portion of the vehicle at the pair of attachment boss parts 32.

The pair of inner pad support parts 22 extend toward the disc radial direction outer side with one inner pad support part 22 extending from one end portion of the inner beam part 21 in the disc rotation direction and the other inner pad support part 22 extending from the other end portion of the inner beam part 21 in the disc rotation direction. The pair of inner pad support parts 22 are disposed on the inner side of the disc 11 similarly to the inner beam part 21.

As illustrated in FIG. 1, one of the pair of pin insertion parts 27 extends across an outer circumferential side of the disc 11 in the disc axial direction from an end portion on the disc radial direction outer side of the inner pad support part 22 on one side in the disc rotation direction. Also, although not illustrated, the other of the pair of pin insertion parts 27 extends across an outer circumferential side of the disc 11 in the disc axial direction from an end portion on the disc radial direction outer side of the inner pad support part 22 on the other side in the disc rotation direction.

Of the pair of outer pad support parts 24, one outer pad support part 24 on one side in the disc rotation direction extends toward the disc radial direction inner side from an end portion of the pin insertion part 27 on a side opposite to the inner pad support part 22, that is, on an outer side on one side in the disc rotation direction. Also, of the pair of outer pad support parts 24, the other outer pad support part 24 on the other side in the disc rotation direction extends toward the disc radial direction inner side from an end portion on the outer side of the pin insertion part 27 on the other side in the disc rotation direction. The pair of outer pad support parts 24 are disposed on an outer side with respect to the disc 11.

The outer beam part 25 extends in the disc rotation direction and connects the end portions of the pair of outer pad support parts 24 on the disc radial direction inner side. The outer beam part 25 is disposed on an outer side with respect to the disc 11 similarly to the pair of outer pad support parts 24.

As described above, the mounting member 12 is disposed across the outer circumferential side of the disc 11 and is mounted on the non-rotating portion of the vehicle. The inner beam part 21 and the pair of inner pad support parts 22 are disposed on an inner side which is a side on which the mounting member 12 is mounted on the non-rotating portion of the vehicle. The pair of outer pad support parts 24 and the outer beam part 25 are disposed on an outer side opposite to the inner side in the mounting member 12.

As illustrated in FIG. 2, pad guide parts 35 are formed in the pair of outer pad support parts 24 on sides facing each other. These pad guide parts 35 have shapes that are recessed away from each other in the disc rotation direction. Although not illustrated, similar pad guide parts are also formed on the pair of inner pad support parts 22.

As illustrated in FIG. 1, one pad spring 15 of the pair of pad springs 15 is attached across the inner pad support part 22 and the outer pad support part 24 on the same one side in the disc rotation direction. As illustrated in FIG. 2, the pad spring 15 includes a recessed guide part 37 that fits into the recessed pad guide part 35 of the outer pad support part 24. Although not illustrated, the pad spring 15 includes a recessed guide part that fits into the recessed pad guide part of the inner pad support part 22.

The other pad spring 15 of the pair of pad springs 15 is attached across the inner pad support part 22 and the outer pad support part 24 on the same other side in the disc rotation direction. The pad spring 15 includes a recessed guide part 37 that fits into the recessed pad guide part 35 of the outer pad support part 24 on the other side in the disc rotation direction. Although not illustrated, the pad spring 15 includes a recessed guide part that fits into the recessed pad guide part of the inner pad support part 22 on the other side in the disc rotation direction.

The pair of brake pads 17 illustrated in FIG. 3 are common parts. As illustrated in FIG. 2, the brake pad 17 includes a back plate 41 and a lining 42 illustrated in FIG.

3 attached to one surface of the back plate 41 in a plate thickness direction. As illustrated in FIG. 2, the back plate 41 has lug parts 44 at both end portions in the disc rotation direction.

In the brake pad 17 of the pair of brake pads 17 disposed on the outer side, the lug parts 44 at both ends in the disc rotation direction fit into each of the pad guide parts 35 of the pair of outer pad support parts 24 via the guide parts 37 of the pair of pad springs 15. At that time, the pair of pad springs 15 elastically support the brake pad 17. In this way, the outer brake pad 17 is supported to be movable in the disc axial direction by the pair of outer pad support parts 24 of the mounting member 12 via the pair of pad springs 15.

In the brake pad 17 of the pair of brake pads 17 disposed on the inner side, the lug parts (not illustrated) at both ends in the disc rotation direction fit into each of the pad guide parts (not illustrated) of the pair of inner pad support parts 22 via respective one of the guide parts (not illustrated) of the pair of pad springs 15. At that time, the pair of pad springs 15 elastically support the brake pad 17. In this way, the inner brake pad 17 is supported to be movable in the disc axial direction by the pair of inner pad support parts 22 of the mounting member 12 via the pair of pad springs 15.

As illustrated in FIG. 3, both the pair of brake pads 17 face the disc 11 in the linings 42. Therefore, in both the pair of brake pads 17, the linings 42 come into contact with the disc 11. The pair of brake pads 17 are pressed against the disc 11 by the caliper 13.

The mounting member 12 includes pin insertion holes (not illustrated) formed in each of the pair of pin insertion parts 27 on both sides in the disc rotation direction illustrated in FIG. 1. A pair of slide pins 47 on both sides of the caliper 13 in the disc rotation direction are slidably fitted into these pin insertion holes. Thereby, the mounting member 12 supports the caliper 13 to be slidable in the disc axial direction at the pair of pin insertion parts 27. In other words, each of the pair of slide pins 47 provided on both sides in the disc rotation direction are slidably fitted into respective one of the pin insertion holes (not illustrated) of the pair of pin insertion parts 27, and thereby the caliper 13 is supported by the mounting member 12 to be movable in the disc axial direction. Each of the pair of boots 16 covers the slide pin 47 protruding from the pin insertion parts 27.

The caliper 13 includes a caliper body 51, the pair of slide pins 47, a pair of pin attachment bolts 52, and a bleeder plug 53. The caliper 13 has a mirror-symmetrical shape except for a configuration related to the bleeder plug 53.

The caliper body 51 is integrally formed by casting. As illustrated in FIG. 3, the caliper body 51 includes a cylinder part 55, a bridge part 56, and a reaction part 57. The cylinder part 55 is disposed on an inner side in the disc axial direction with respect to the disc 11. The bridge part 56 extends from the disc radial direction outer side of the cylinder part 55 toward the outer side in the disc axial direction. The bridge part 56 extends across an outer circumferential surface of the disc 11 from the cylinder part 55. The reaction part 57 extends toward the disc radial direction inner side from a side of the bridge part 56 opposite to the cylinder part 55 in the disc axial direction, and is disposed on an outer side in the disc axial direction with respect to the disc 11.

Figure 4:
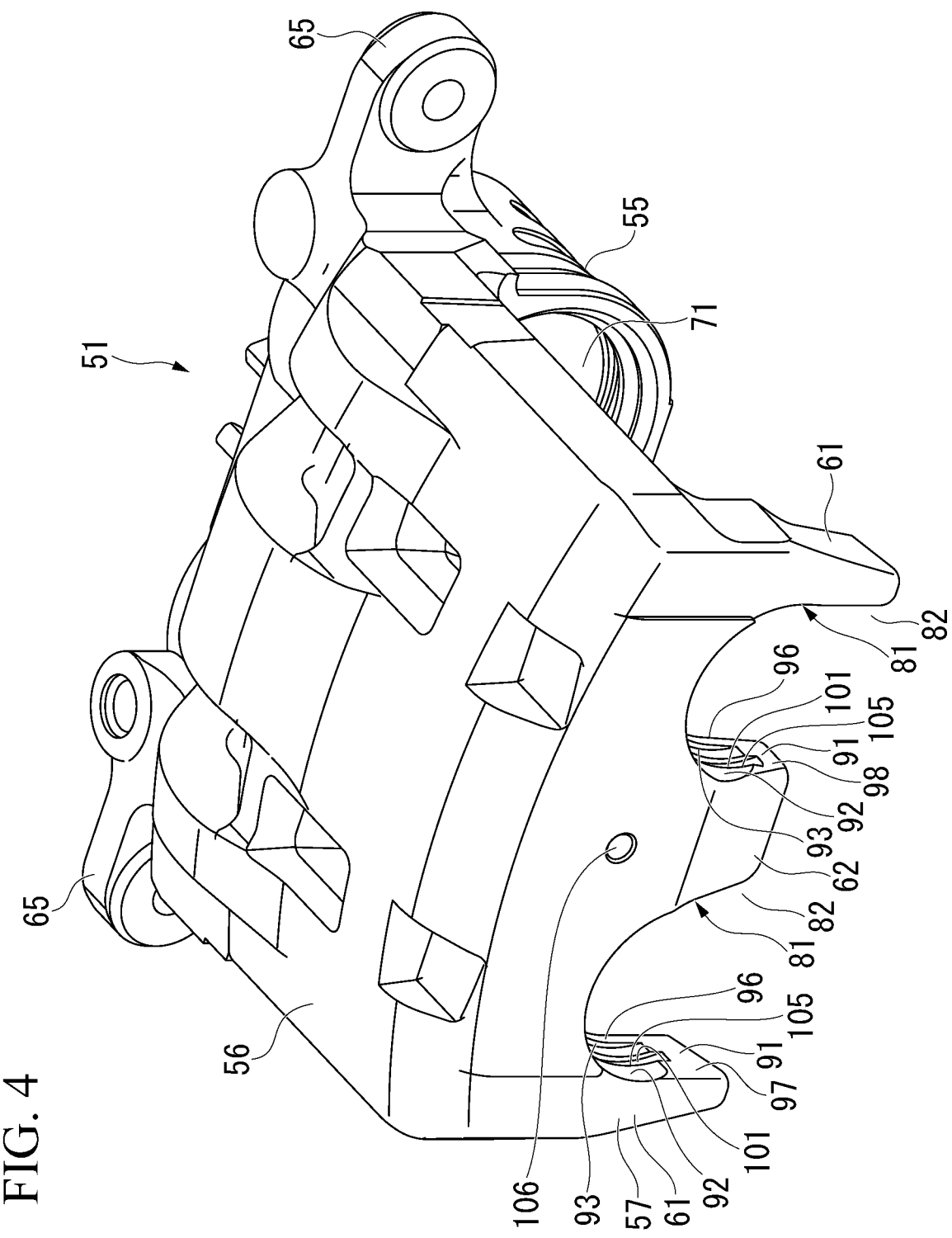
FIG. 4 is a perspective view illustrating a caliper body of the disc brake of the embodiment.
Figure 5:
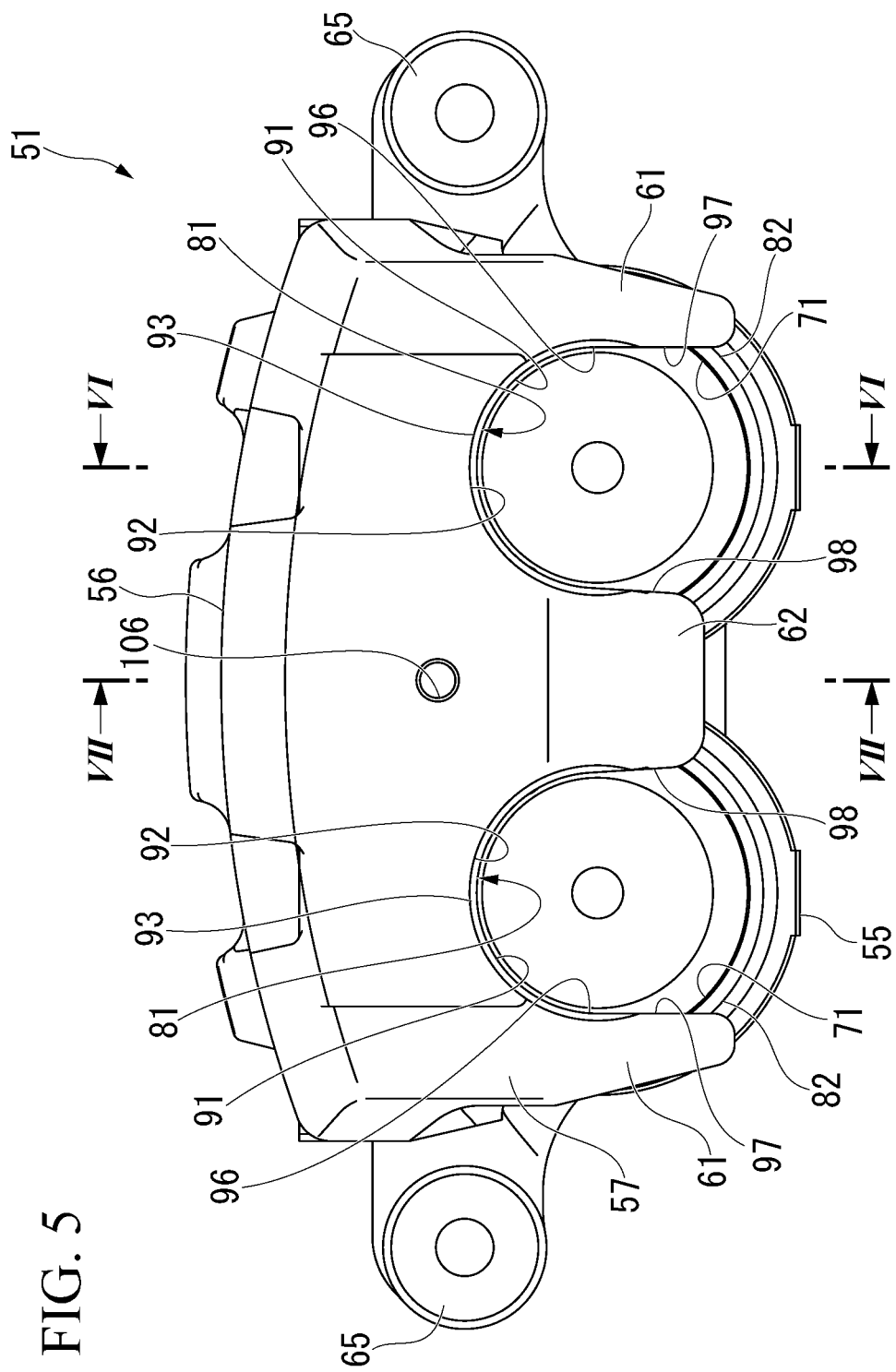
FIG. 5 is a front view illustrating the caliper body of the disc brake of the embodiment.

As illustrated in FIGS. 4 and 5, the reaction part 57 includes a pair of outer claw parts 61 (claw parts) and an intermediate claw part 62 (claw part) between the outer claw parts 61. In other words, the reaction part 57 includes a plurality of claw parts including the pair of outer claw parts 61 and the intermediate claw part 62.

Both the pair of outer claw parts 61 and the intermediate claw part 62 extend toward the disc radial direction inner side from a side of the bridge part 56 opposite to the cylinder part 55 in the disc axial direction. Both the pair of outer claw parts 61 and the intermediate claw part 62 are positioned on the outer side in the disc axial direction with respect to the disc 11. In other words, both the pair of outer claw parts 61 and the intermediate claw part 62 are formed on an extended distal end side of the bridge part 56. As illustrated in FIG. 5, both the pair of outer claw parts 61 and the intermediate claw part 62 are disposed to face the cylinder part 55 in the disc axial direction while positions thereof overlap with the cylinder part 55 in the disc rotation direction and the disc radial direction. The pair of outer claw parts 61 have a smaller width in the disc rotation direction and a larger length in the disc radial direction than the intermediate claw part 62.

As illustrated in FIG. 4, the caliper body 51 includes a pair of pin attachment parts 65 extending from the cylinder part 55 to both sides in the disc rotation direction. As illustrated in FIG. 1, one slide pin 47 is attached to one pin attachment part 65 of the pair of pin attachment parts 65 by one pin attachment bolt 52. The other slide pin 47 is attached to the other pin attachment part 65 of the pair of pin attachment parts 65 by the other pin attachment bolt 52.

Figure 6:
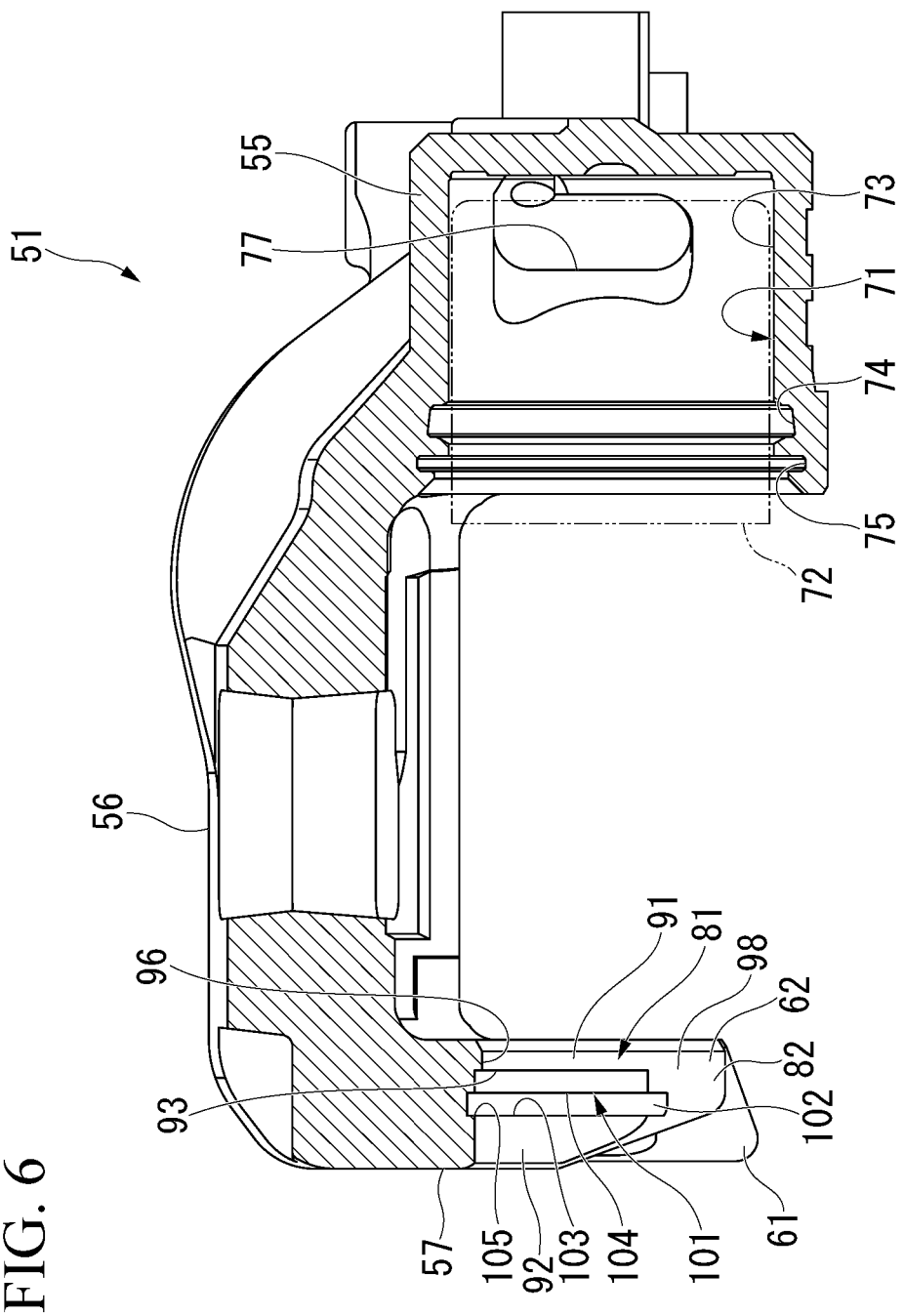
FIG. 6 is a cross-sectional view illustrating the caliper body of the disc brake of the embodiment along line VI-VI of FIG. 5.

As illustrated in FIG. 6, a cylinder hole 71 that has one end opening toward the reaction part 57 side and that is recessed toward a side opposite to the reaction part 57 in the disc axial direction is formed in the cylinder part 55. In other words, the cylinder hole 71 is recessed toward a side opposite to the disc 11. The cylinder hole 71 extends in the disc axial direction. As illustrated in FIG. 5, a plurality of cylinder holes 71, specifically, two cylinder holes 71, are provided in the cylinder part 55. These cylinder holes 71 have the same shape as each other, and are provided to be aligned in the disc rotation direction with positions thereof aligned in the disc axial direction and the disc radial direction and positions thereof shifted from each other in the disc rotation direction.

A piston 72 (only an outer shape is illustrated by a two-dot dashed line in FIG. 6) is disposed in each of the cylinder holes 71 to be movable in the disc axial direction. As illustrated in FIG. 6, the cylinder hole 71 includes a guide surface 73 that is a cylindrical surface for guiding movement of the piston 72, an annular seal fitting groove 74 that is recessed radially outward with respect to the guide surface 73, and an annular boot fitting groove 75 that is recessed radially outward with respect to the guide surface 73. The boot fitting groove 75 is disposed on the reaction part 57 side in the disc axial direction with respect to the seal fitting groove 74.

Although not illustrated, an annular piston seal that seals a gap between the seal fitting groove 74 and the piston 72 is fitted to the seal fitting groove 74. Also, the other end of the extendable and contractible boot, whose one end is fitted to a portion of the piston 72 protruding from the cylinder hole 71, is fitted to the boot fitting groove 75 to cover the portion of the piston 72 protruding from the cylinder hole 71.

Figure 7:
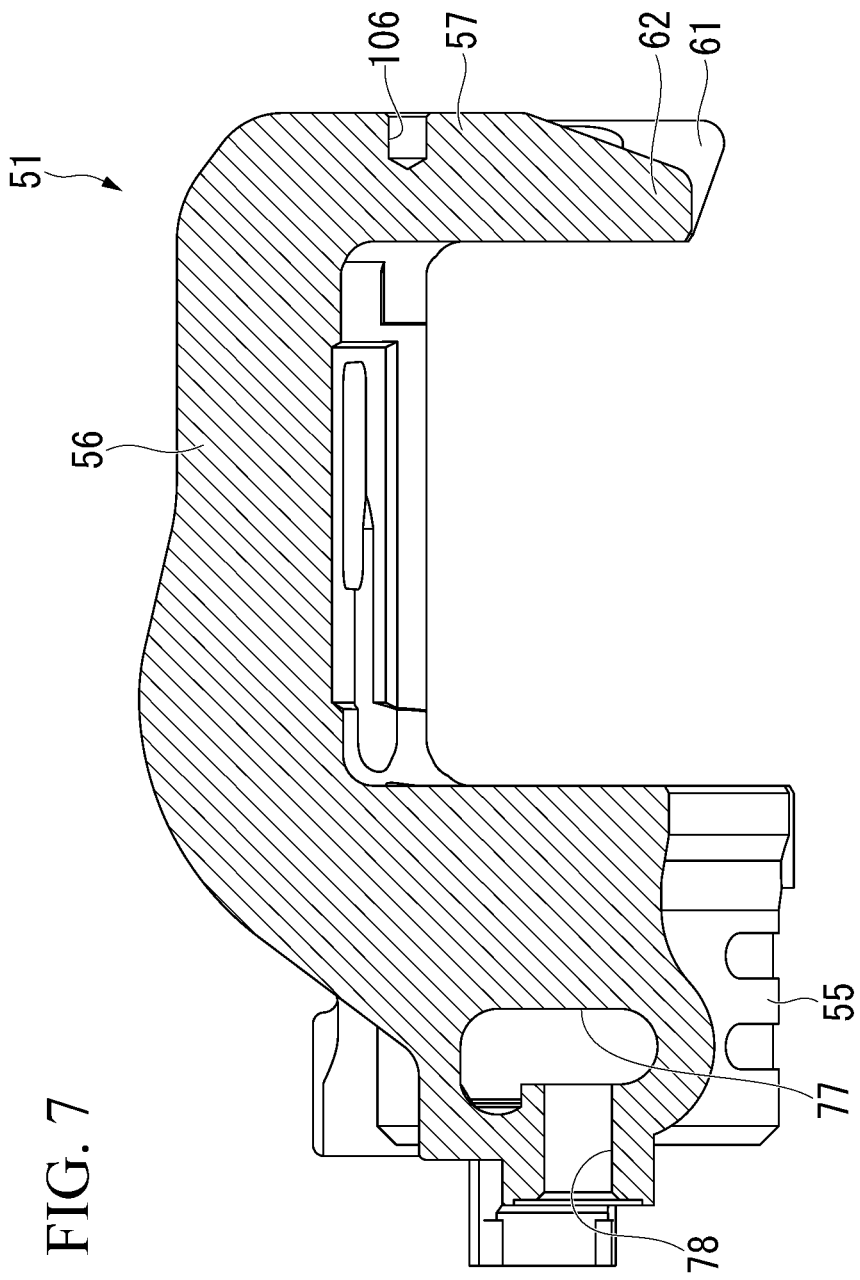
FIG. 7 is a cross-sectional view illustrating the caliper body of the disc brake of the embodiment along line VII-VII of FIG. 5.

A communication passage 77 for connecting two cylinder holes 71 and a piping hole 78 for opening the communication passage 77 to the outside of the cylinder part 55 as illustrated in FIG. 7 are formed in the cylinder part 55 on a side opposite to the reaction part 57 in the disc axial direction. The communication passage 77 and the piping hole 78 are provided at a central position of the caliper body 51 in the disc rotation direction.

As illustrated in FIGS. 4 and 5, the pair of outer claw parts 61 and the intermediate claw part 62 are disposed apart from each other in the disc rotation direction. Thereby, the reaction part 57 has recessed parts 81 having a shape in which a space between the outer claw part 61 and the intermediate claw part 62 adjacent to each other in the disc rotation direction penetrates in the disc axial direction and opens inward in the disc radial direction. In other words, the recessed parts 81 are provided between the pair of outer claw parts 61 and the intermediate claw part 62 and have a shape that is recessed from the end portion of the reaction part 57 on the disc radial direction inner side toward the disc radial direction outer side. The recessed parts 81 each have an opening 82 at an inner end in the disc radial direction.

Specifically, since the reaction part 57 has three claw parts including the pair of outer claw parts 61 and the intermediate claw part 62, two recessed parts 81 are provided in the reaction part 57. As illustrated in FIG. 5, the recessed parts 81 are formed to face the cylinder holes 71 in the caliper body 51. That is, the caliper body 51 includes the same number of recessed parts 81 as the number of cylinder holes 71.

One recessed part 81 of the two recessed parts 81 is provided between one outer claw part 61 of the pair of outer claw parts 61 and the intermediate claw part 62. Positions of one recessed part 81 of the two recessed parts 81 and one cylinder hole 71 of the two cylinder holes 71 facing the one recessed part 81 overlap each other in the disc rotation direction and the disc radial direction. The one recessed part 81 is a portion through which a tool for processing the guide surface 73, the seal fitting groove 74, the boot fitting groove 75, or the like illustrated in FIG. 6 of the one cylinder hole 71 facing the one recessed part 81 is inserted.

Also, as illustrated in FIG. 5, the other recessed part 81 of the two recessed parts 81 is provided between the other outer claw part 61 of the pair of outer claw parts 61 and the intermediate claw part 62. Positions of the other recessed part 81 and the other cylinder hole 71 of the two cylinder holes 71 facing the other recessed part 81 overlap each other in the disc rotation direction and the disc radial direction. The other recessed part 81 is also a portion through which a tool for processing the guide surface 73, the seal fitting groove 74, the boot fitting groove 75, or the like of the other cylinder hole 71 facing the other recessed part 81 is inserted.

These recessed parts 81 have a mirror-symmetrical shape, and are provided to be aligned in the disc rotation direction with positions thereof aligned in the disc axial direction and the disc radial direction and positions thereof shifted from each other in the disc rotation direction. Since the two recessed parts 81 have a mirror-symmetrical shape, one of the recessed parts 81 will be described here as an example.

As illustrated in FIGS. 4 to 6, an inner surface 91 of the recessed part 81 has a main inner surface part 92 and a stepped surface part 93. The main inner surface part 92 has a cylindrical surface shape and is formed to pass through from an intermediate portion of the inner surface 91 in the disc axial direction to a side opposite to the cylinder part 55. The stepped surface part 93 has a planar shape extending inward in the radial direction of the main inner surface part 92 from an end edge portion of the main inner surface part 92 on the cylinder part 55 side in the disc axial direction. As illustrated in FIG. 5, the main inner surface part 92 is a cylindrical surface that is coaxial with a central axis of the cylinder hole 71. In other words, the main inner surface part 92 is a cylindrical surface extending in the disc axial direction. The stepped surface part 93 is a plane perpendicular to the central axis of the cylinder hole 71. The main inner surface part 92 is longer in a circumferential direction than a half of the cylindrical surface that is continuous over the entire circumference. In other words, the main inner surface part 92 has a central angle of more than 180°.

Also, as illustrated in FIG. 4, the inner surface 91 of the recessed part 81 includes a back side inner surface part 96, an end side inner surface part 97, and an intermediate side inner surface part 98. The back side inner surface part 96 is on the cylinder part 55 side in the disc axial direction with respect to the stepped surface part 93 and has a substantially cylindrical surface shape. The end side inner surface part 97 has a substantially planar shape extending inward in the radial direction from an end edge portion on the outer claw part 61 side of the main inner surface part 92 and on the disc radial direction inner side. The intermediate side inner surface part 98 has a substantially planar shape extending inward in the radial direction from an end edge portion on the intermediate claw part 62 side of the main inner surface part 92 and on the disc radial direction inner side.

As illustrated in FIG. 5, the back side inner surface part 96 has a cylindrical surface that is coaxial with the central axis of the cylinder hole 71 and has a smaller diameter than the main inner surface part 92. The end side inner surface part 97 and the intermediate side inner surface part 98 extend in the central axis of the cylinder hole 71 and substantially extend along a line extending in a disk radial direction through a center of the caliper body 51 in the disc rotation direction. The main inner surface part 92 is recessed from the back side inner surface part 96 outward in the radial direction thereof. Also, the main inner surface part 92 is recessed in the disc rotation direction with respect to the end side inner surface part 97 and is recessed in the disc rotation direction with respect to the intermediate side inner surface part 98.

Figure 8:
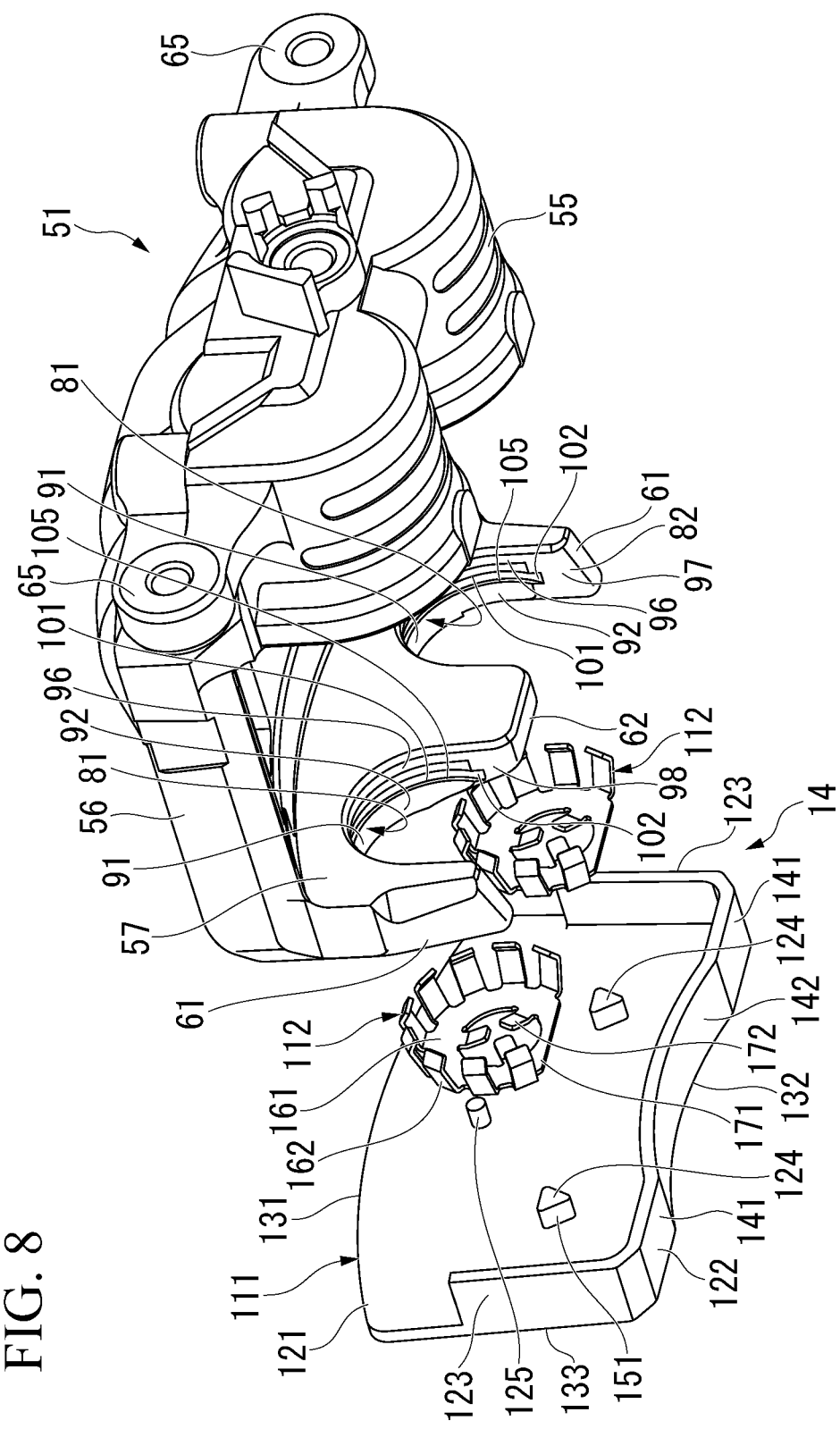
FIG. 8 is an exploded perspective view illustrating the caliper body, a cover member, and a locking member of the disc brake of the embodiment.

As illustrated in FIGS. 4 and 8, the inner surface 91 of the recessed part 81 includes a locking groove 101 recessed outward in the radial direction of the main inner surface part 92 from an intermediate portion of the main inner surface part 92 in the disc axial direction. The entire locking groove 101 has an arc shape along the inner surface 91 of the recessed part 81. The locking groove 101 has an arc shape concentric with the main inner surface part 92. The locking groove 101 is formed throughout the circumferential direction of the main inner surface part 92, and both ends thereof in the circumferential direction overlap the end side inner surface part 97 and the intermediate side inner surface part 98 in positions in the circumferential direction. In other words, in the locking groove 101, an intermediate portion in the circumferential direction is formed throughout the circumferential direction of the main inner surface part 92, and both end portions in the circumferential direction enter the end side inner surface part 97 side and the intermediate side inner surface part 98 side with respect to the main inner surface part 92. The locking groove 101 also has a central angle of more than 180° similarly to the main inner surface part 92.

As illustrated in FIG. 6, the locking groove 101 has a groove bottom surface 102 and a pair of wall surfaces 103 and 104. The groove bottom surface 102 has a cylindrical surface shape concentric with the main inner surface part 92. The groove bottom surface 102 also has a central angle of more than 180°. The pair of wall surfaces 103 and 104 have a planar shape that rises inward in the radial direction of the groove bottom surface 102 from both end edge portions of the groove bottom surface 102 in the disc axial direction. Both the pair of wall surfaces 103 and 104 have a planar shape extending perpendicular to a central axis of the groove bottom surface 102. In other words, both the pair of wall surfaces 103 and 104 have a planar shape extending perpendicular to a central axis of the main inner surface part 92. As illustrated in FIG. 8, an end edge portion 105 on the main inner surface part 92 side of the wall surface 103 of the pair of wall surfaces 103 and 104 on a side opposite to the cylinder part 55 has an arc shape. The end edge portion 105 also has a central angle of more than 180°.

Here, the back side inner surface part 96, the end side inner surface part 97, and the intermediate side inner surface part 98 illustrated in FIG. 4 can be the same casted surface that has been casted at the time of casting the caliper body 51. In contrast, as illustrated in FIG. 6, the main inner surface part 92, the stepped surface part 93, the groove bottom surface 102 and the pair of wall surfaces 103 and 104 of the locking groove 101 are cutting machined surfaces formed on the caliper body 51 by cutting machining after casting.

As illustrated in FIG. 8, the main inner surface part 92 is recessed in the disc rotation direction with respect to the end side inner surface part 97. The main inner surface part 92 is recessed in the disc rotation direction with respect to the intermediate side inner surface part 98. The locking groove 101 has a distance between both end portions on the opening 82 side of the recessed part 81 smaller than a diameter thereof. That is, in the locking groove 101, a distance between both end portions in the circumferential direction of the groove bottom surface 102 on the opening 82 side of the recessed part 81 is smaller than a diameter of the groove bottom surface 102.

As illustrated in FIGS. 4, 5, and 7, a fitting recessed part 106 recessed from a distal end surface on a side opposite to the cylinder part 55 is formed in the reaction part 57 at a portion on a side opposite to the cylinder part 55 in the disc axial direction. The fitting recessed part 106 is a round hole and is disposed at the central position of the reaction part 57 in the disc rotation direction. In other words, the fitting recessed part 106 is disposed at a central position between the two recessed parts 81 of the reaction part 57. Also, the fitting recessed part 106 is disposed on the bridge part 56 side in the disc radial direction with respect to the two recessed parts 81 of the reaction part 57.

As illustrated in FIG. 3, of the pair of brake pads 17, the outer brake pad 17 supported by the pair of outer pad support parts 24 of the mounting member 12 is disposed between the reaction part 57 and the disc 11. Also, of the pair of brake pads 17, the inner brake pad 17 supported by the pair of inner pad support parts 22 of the mounting member 12 is disposed between the cylinder part 55 and the piston 72 illustrated in FIG. 6 provided in the cylinder part 55, and the disc 11.

As illustrated in FIG. 8, the cover component 14 includes a cover member 111 and a locking member 112 which is a member (separate body) different from the cover member 111. Two locking members 112 that are equal in number to the recessed parts 81 are provided.

Figure 9:
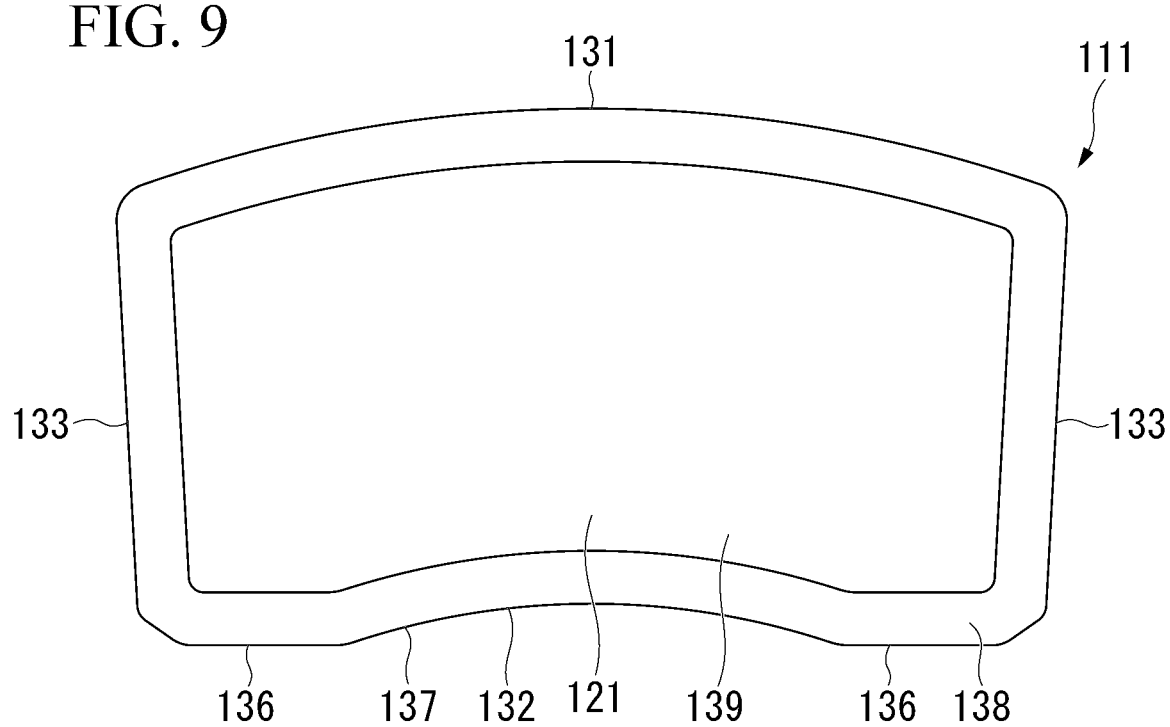
FIG. 9 is a front view illustrating the cover member of the disc brake of the embodiment.
Figure 10:
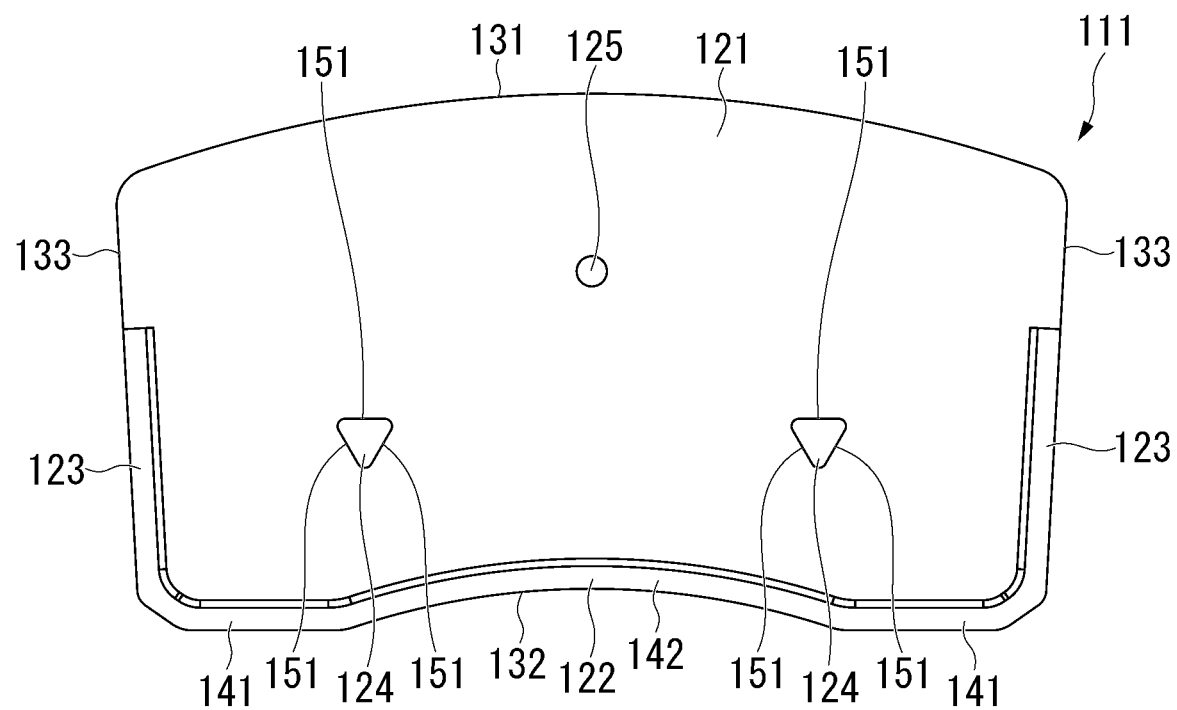
FIG. 10 is a rear view illustrating the cover member of the disc brake of the embodiment.

The cover member 111 has a shape illustrated in FIGS. 9 to 14. The cover member 111 is an integrally formed product made of a metal such as, for example, an aluminum alloy and has a mirror-symmetrical shape. As illustrated in FIG. 10, the cover member 111 includes a main plate part 121, an inwardly bent part 122, a pair of side surface bent parts 123, a pair of mounting parts 124, and a fitting protruding part 125 (fitting part). Further, the cover member 111 is not limited to being made of a metal such as an aluminum alloy and may be integrally formed using a material such as a resin.

As illustrated in FIG. 9, the main plate part 121 has a substantially rectangular flat plate shape and includes a long side edge part 131, a long side edge part 132, and a pair of short side edge parts 133 on an outer circumferential portion thereof. One long side edge part 131 has an arc shape that bulges toward the outside of the main plate part 121 as a whole. Also, the other long side edge part 132 includes a pair of linear end side edge parts 136 disposed on the same straight line, and an arcuate intermediate edge part 137 that is between the end side edge parts 136 and is recessed toward the inside of the main plate part 121. The pair of short side edge parts 133 of the main plate part 121 has a linear shape and connects the long side edge part 131 and the long side edge part 132. A distance between the pair of short side edge parts 133 is slightly longer on the long side edge part 131 side than that on the long side edge part 132 side.

Figure 14:
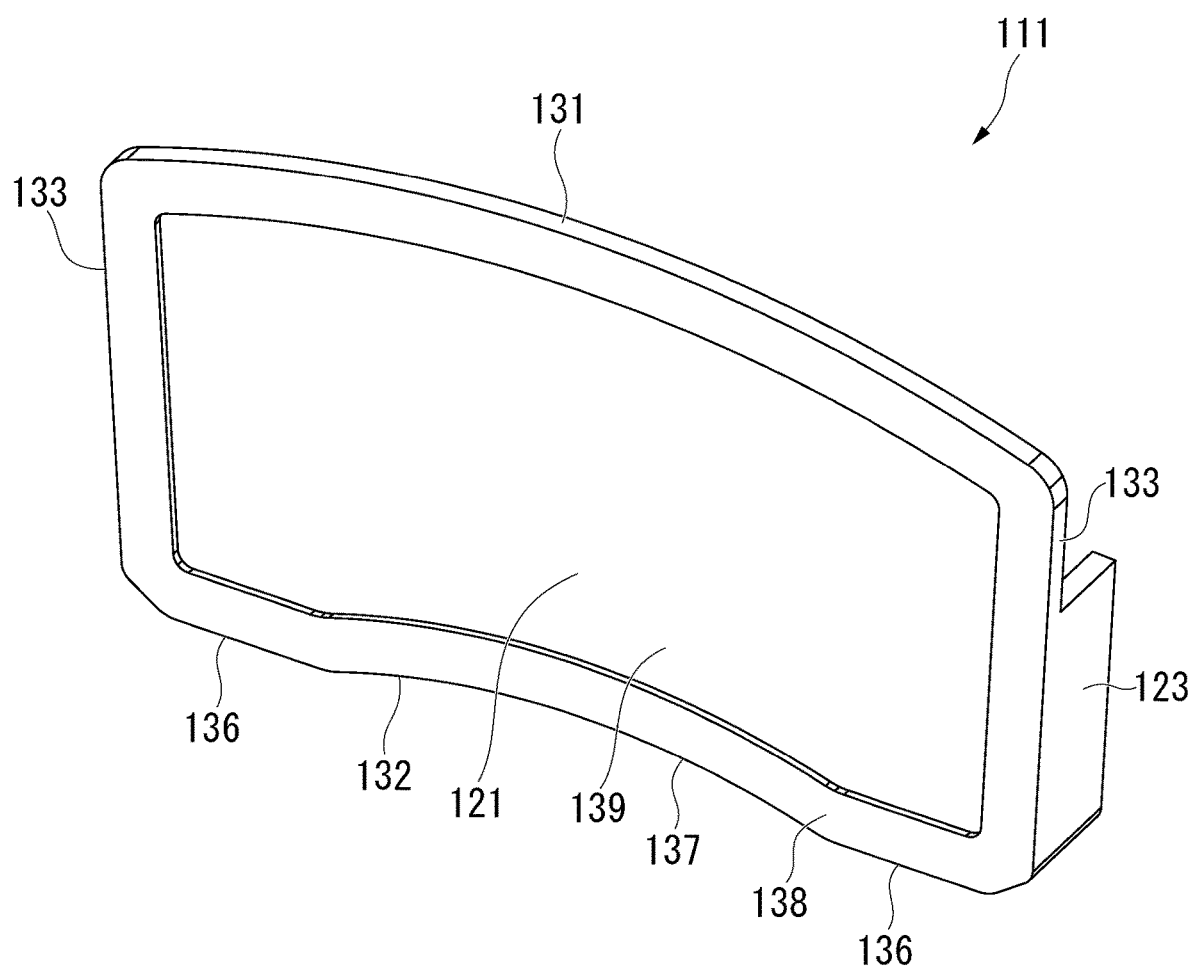
FIG. 14 is a perspective view illustrating the cover member of the disc brake of the embodiment.

As illustrated in FIG. 14, the main plate part 121 includes the long side edge part 131, the long side edge part 132, and the pair of short side edge parts 133, and a portion along these parts is a thick part 138. An inner side of the thick part 138 is a thin part 139 that is thinner than the thick part 138. The thick part 138 is continuous over the entire circumference of the main plate part 121 and forms a loop shape surrounding the thin part 139 over the entire circumference. The thick part 138 protrudes from the thin part 139 to one side in a thickness direction thereof.

Figure 11:
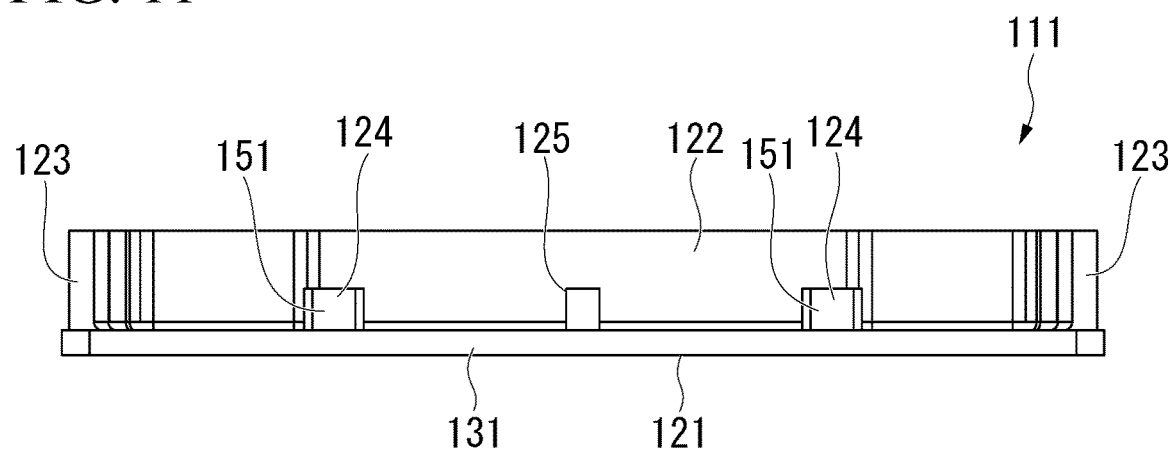
FIG. 11 is a plan view illustrating the cover member of the disc brake of the embodiment.
Figure 12:
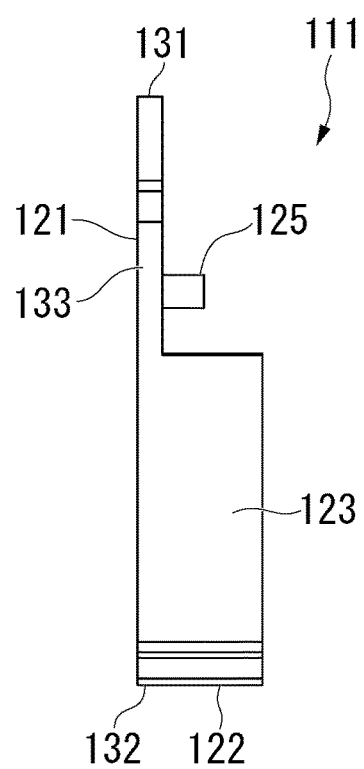
FIG. 12 is a side view illustrating the cover member of the disc brake of the embodiment.

The inwardly bent part 122 illustrated in FIGS. 10 to 13 extends in a direction opposite to a direction in which the thick part 138 protrudes from the thin part 139 of the main plate part 121. As illustrated in FIG. 12, the inwardly bent part 122 rises perpendicular to the main plate part 121 from the entire long side edge part 132 of the main plate part 121 and has a wall shape having a constant height as illustrated in FIG. 11. The inwardly bent part 122 has a shape along the long side edge part 132 of the main plate part 121 illustrated in FIG. 9.

Figure 13:
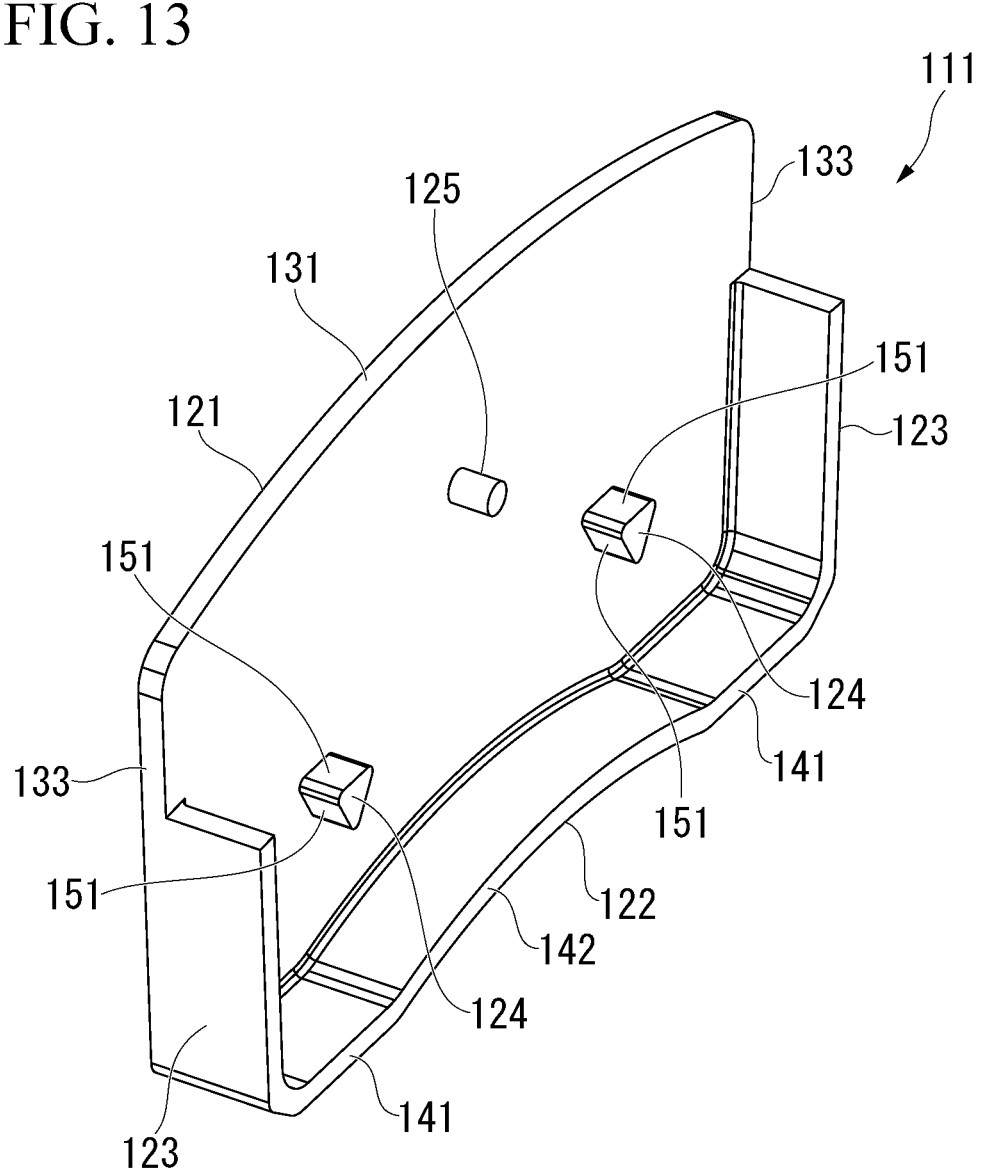
FIG. 13 is a perspective view illustrating the cover member of the disc brake of the embodiment.

As illustrated in FIGS. 10 and 13, the inwardly bent part 122 has a pair of end side plate parts 141 and an intermediate plate part 142. The pair of end side plate parts 141 rises perpendicular to the main plate part 121 from the pair of end side edge parts 136 illustrated in FIG. 9. The intermediate plate part 142 rises perpendicular to the main plate part 121 from the intermediate edge part 137 illustrated in FIG. 9. The pair of end side plate parts 141 have a flat plate shape and are disposed on the same plane. The intermediate plate part 142 has an arc shape that is recessed toward the inside of the main plate part 121.

As illustrated in FIG. 13, the pair of side surface bent parts 123 rises from the main plate part 121 to the same side as the inwardly bent part 122. One side surface bent part 123 of the pair of side surface bent parts 123 rises perpendicular to the main plate part 121 from one short side edge part 133 of the main plate part 121 and has a wall shape having a constant height. The one side surface bent part 123 is formed in a range from an end portion of the one short side edge part 133 on the inwardly bent part 122 side to an intermediate position on the long side edge part 131 side and is continuous with the inwardly bent part 122.

The other side surface bent part 123 of the pair of side surface bent parts 123 rises perpendicular to the main plate part 121 from the other short side edge part 133 of the main plate part 121 and has a wall shape having a constant height. The other side surface bent part 123 is formed in a range from an end portion of the other short side edge part 133 on the inwardly bent part 122 side to an intermediate position on the long side edge part 131 side and is continuous with the inwardly bent part 122. The pair of side surface bent parts 123 and the inwardly bent part 122 have the same protrusion height from the main plate part 121 and are formed at a position of the thick part 138, illustrated in FIG. 14, of the main plate part 121.

As illustrated in FIG. 13, the pair of mounting parts 124 rises perpendicularly from the main plate part 121 to the same side as the inwardly bent part 122 and the pair of side surface bent parts 123. As illustrated in FIG. 10, the pair of mounting parts 124 are disposed at positions at which a distance from the inwardly bent part 122 is smaller than a distance from the long side edge part 131.

The pair of mounting parts 124 are equilateral triangular columns each having three side surfaces 151. The pair of mounting parts 124 are each formed so that one side surface 151 is parallel to the end side plate part 141 and faces in a direction opposite to the end side plate part 141, and a corner portion between remaining two side surfaces 151 faces the intermediate plate part 142.

The pair of mounting parts 124 have the same distance from the pair of end side plate parts 141. One mounting part 124 is disposed near one side surface bent part 123 of the pair of side surface bent parts 123. The other mounting part 124 is disposed near the other side surface bent part 123. A distance between one mounting part 124 and one side surface bent part 123 near the one mounting part 124 is equivalent to a distance between the other mounting part 124 and the other side surface bent part 123 near the other mounting part 124. A distance between centers of the pair of mounting parts 124 is set to be equal to a distance between centers of the cylindrical surface-shaped main inner surface parts 92 of the pair of recessed parts 81 illustrated in FIG. 5.

As illustrated in FIG. 13, the fitting protruding part 125 has a columnar shape and rises perpendicularly from the main plate part 121 to the same side as the inwardly bent part 122, the pair of side surface bent parts 123, and the pair of mounting parts 124. The fitting protruding part 125 is disposed at a position at which a distance from the long side edge part 131 is smaller than a distance from the inwardly bent part 122. Therefore, the fitting protruding part 125 is disposed on a side opposite to the inwardly bent part 122 with respect to the pair of mounting parts 124. As illustrated in FIG. 10, the fitting protruding part 125 is disposed at a central position between the pair of side surface bent parts 123. In other words, the fitting protruding part 125 is disposed at a central position of the cover member 111 in a longitudinal direction. The fitting protruding part 125 is spaced equidistant from each of the pair of mounting parts 124. A distance between a center of the fitting protruding part 125 and a center of the mounting part 124 is the same as a distance between a center of the cylindrical surface-shaped main inner surface part 92 of the recessed part 81 and a center of the fitting recessed part 106 in the caliper body 51 illustrated in FIG. 5.

The locking member 112 has a shape illustrated in FIGS. 15 to 19. The locking member 112 is an integrally formed product formed by press forming from a spring steel plate and has a mirror-symmetrical shape. The locking member 112 includes a fixing part 161 and a plurality of locking pieces 162.

Figure 15:
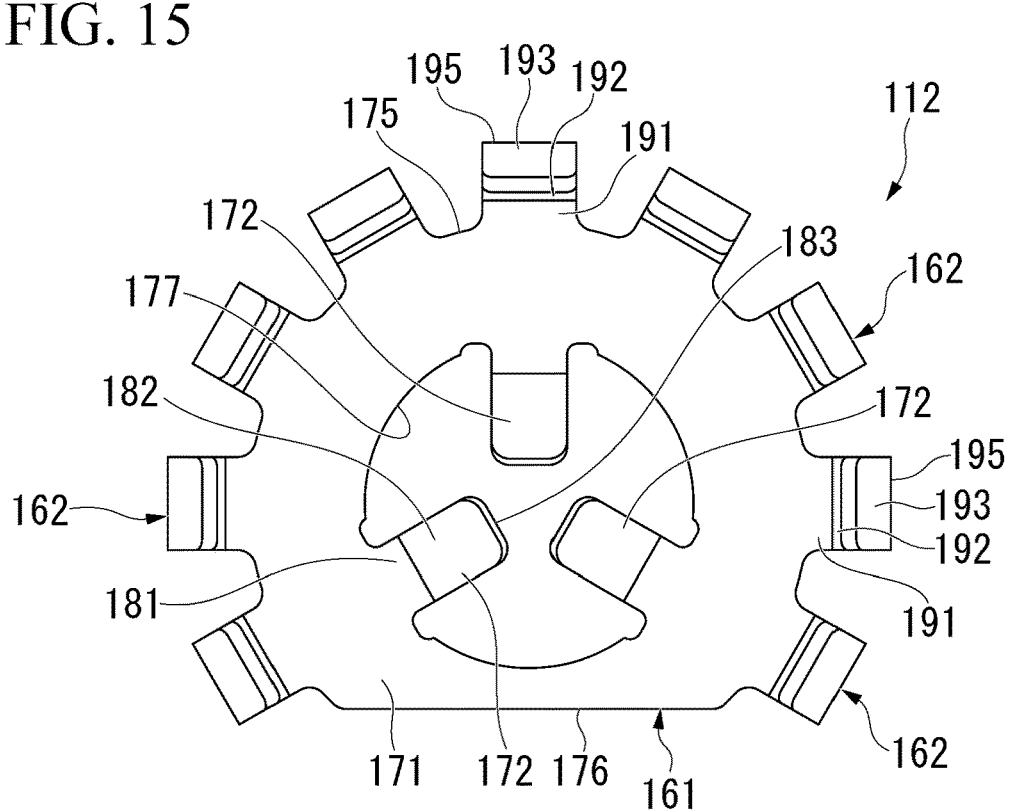
FIG. 15 is a front view illustrating the locking member of the disc brake of the embodiment.
Figure 16:
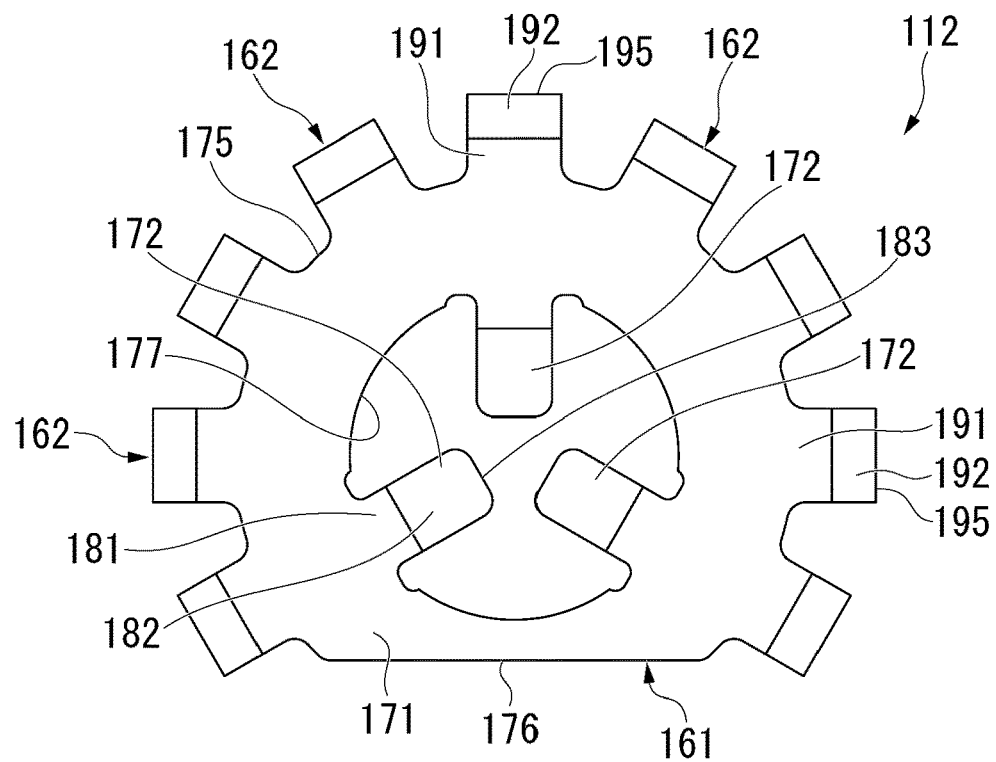
FIG. 16 is a rear view illustrating the locking member of the disc brake of the embodiment.

As illustrated in FIGS. 15 and 16, the fixing part 161 includes a base plate part 171 and a plurality of fixing pieces 172. The base plate part 171 has a flat plate shape and has a shape in which an outer circumferential side of a disc is partially cut out in a straight line. That is, the base plate part 171 includes an arc-shaped arcuate edge part 175 and a linear-shaped linear edge part 176 on an outer circumferential portion thereof. The base plate part 171 includes a substantially circular inner circumferential edge part 177 that is coaxial with the arcuate edge part 175. The fixing part 161 includes three fixing pieces 172 that are equal in number to the side surfaces 151 of the mounting part 124.

One fixing piece 172 of the three fixing pieces 172 is disposed on a line connecting a center of the arcuate edge part 175 in a circumferential direction and a center of the linear edge part 176 in a length direction in the base plate part 171. This fixing piece 172 is disposed at a position of the inner circumferential edge part 177 farthest from the linear edge part 176. Remaining two fixing pieces 172 of the three fixing pieces 172 are disposed on both sides of the fixing piece 172 described above. The three fixing pieces 172 are disposed at equal intervals in the circumferential direction of the inner circumferential edge part 177 and are disposed at intervals of 120°.

The three fixing pieces 172 have the same shape. The fixing pieces 172 each have an inner base plate part 181 and a fixing plate part 182. The inner base plate part 181 has a flat plate shape and extends inward in a radial direction of the inner circumferential edge part 177 from the inner circumferential edge part 177 of the base plate part 171 while having the same planar shape as the base plate part 171. The fixing plate part 182 has a flat plate shape and extends inward in the radial direction of the inner circumferential edge part 177 from an end edge portion of the inner base plate part 181 on an extension distal end side while being inclined with respect to the base plate part 171. The fixing plate part 182 is inclined so that it becomes further away from the base plate part 171 in a thickness direction of the base plate part 171 with distance extending from the inner base plate part 181.

The three fixing pieces 172 extend from the base plate part 171 to the same side in a thickness direction thereof. A distal end edge portion 183 of the fixing plate part 182 on a side opposite to the inner base plate part 181 has a linear shape. The three distal end edge portions 183 of the three fixing pieces 172 are disposed to form an equilateral triangle. The equilateral triangle formed by the three distal end edge portions 183 is smaller than the equilateral triangle formed by the three side surfaces 151 of the mounting part 124.

Three or more locking pieces 162, specifically nine, are provided in the locking member 112. One locking piece 162 of the nine locking pieces 162 is disposed on a line connecting the center of the arcuate edge part 175 in the circumferential direction and the center of the linear edge part 176 in the length direction in the base plate part 171. Therefore, this locking piece 162 is aligned with the fixing piece 172 at the position farthest from the linear edge part 176 in the circumferential direction of the arcuate edge part 175. This locking piece 162 is disposed at a position of the arcuate edge part 175 farthest from the linear edge part 176. Remaining eight locking pieces 162 of the nine locking pieces 162 are disposed four at each of both sides of the locking piece 162 described above. The nine locking pieces 162 are disposed at equal intervals in the circumferential direction of the arcuate edge part 175 and are disposed at intervals of 30°.

The locking piece 162 at one end in a disposition direction is aligned with one fixing piece 172 on a side closer to the linear edge part 176 in the circumferential direction of the arcuate edge part 175. The locking piece 162 at the other end in the disposition direction is aligned with the other one fixing piece 172 on a side closer to the linear edge part 176 in the circumferential direction of the arcuate edge part 175. When three or more locking pieces 162 are provided in the locking member 112, no matter how many they are provided, three of them are preferably disposed at the position of the locking piece 162 at the center in the disposition direction of the nine locking pieces 162 described above and at the positions of the locking pieces 162 at both ends. Further, the fixing piece 172 is not provided at the linear edge part 176.

Figure 17:
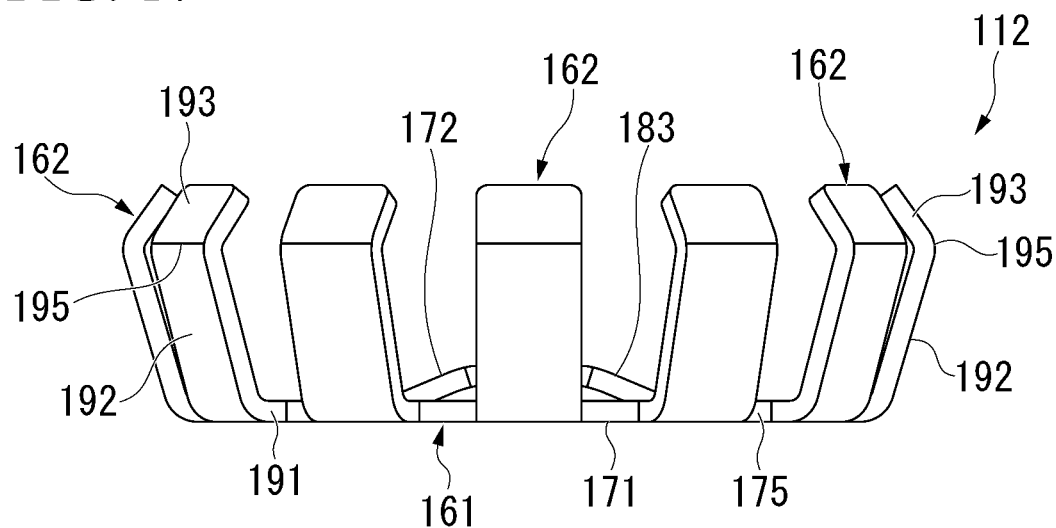
FIG. 17 is a plan view illustrating the locking member of the disc brake of the embodiment.
Figure 18:
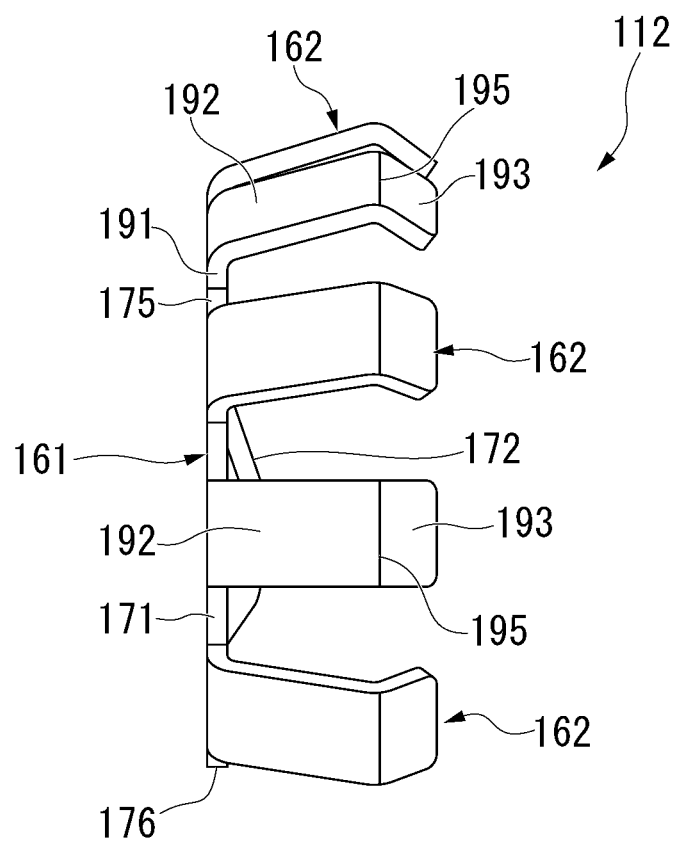
FIG. 18 is a side view illustrating the locking member of the disc brake of the embodiment.
Figure 19:
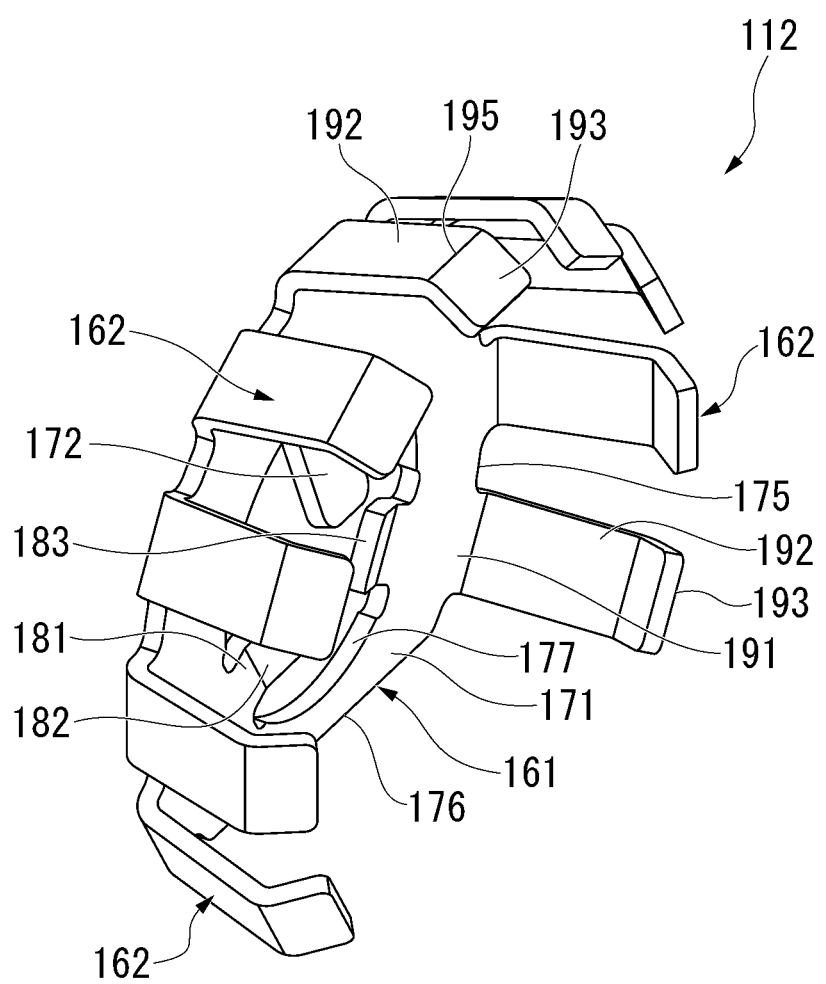
FIG. 19 is a perspective view illustrating the locking member of the disc brake of the embodiment.

The nine locking pieces 162 have the same shape. As illustrated in FIGS. 17 to 19, the nine locking pieces 162 extend to the same side in a thickness direction thereof from the base plate part 171. The locking pieces 162 each have an outer base plate part 191, an intermediate plate part 192, and a distal end plate part 193. The outer base plate part 191 has a flat plate shape and extends outward in a radial direction of the arcuate edge part 175 from the arcuate edge part 175 of the base plate part 171 while having the same planar shape as the base plate part 171.

The intermediate plate part 192 has a flat plate shape and extends to one side in the thickness direction of the base plate part 171 from an end edge portion of the outer base plate part 191 on an extension distal end side. The intermediate plate part 192 is inclined so that it is positioned further outward in the radial direction of the arcuate edge part 175 with distance away from the outer base plate part 191. All the intermediate plate parts 192 of the nine locking pieces 162 are inclined at the same angle with respect to the base plate part 171. Therefore, the nine locking pieces 162 have a shape in which all the intermediate plate parts 192 become larger in diameter with distance away from the base plate part 171 as a whole. The intermediate plate part 192 has an angle of more than 90° and less than 135° with respect to the continuously adjacent outer base plate part 191.

The distal end plate part 193 has a flat plate shape and extends from an end edge portion of the intermediate plate part 192 on a side opposite to the outer base plate part 191 to a side opposite to the base plate part 171 in the thickness direction of the base plate part 171. The distal end plate part 193 is inclined so that it is positioned further inward in the radial direction of the arcuate edge part 175 with distance away from the intermediate plate part 192. The nine locking pieces 162 all have the same angle formed by the distal end plate part 193 and the intermediate plate part 192. Therefore, the nine locking pieces 162 have a shape in which all the distal end plate parts 193 as a whole become smaller in diameter with distance away from the base plate part 171. The distal end plate part 193 has an obtuse angle with respect to the continuously adjacent intermediate plate part 192.

A boundary part 195 on an outer side of the arcuate edge part 175 in the radial direction between the intermediate plate part 192 and the continuously adjacent distal end plate part 193 is linear. All the boundary parts 195 of the nine locking pieces 162 are disposed to be tangent to the same circle. A diameter of this circle is larger than a diameter of the end edge portion 105 of the locking groove 101 of the recessed part 81, in other words, larger than a diameter of the main inner surface part 92. Also, edge portions of extension distal ends of all the distal end plate parts 193 of the nine locking pieces 162 are disposed to be tangent to the same circle. The diameter of this circle is smaller than the diameter of the main inner surface part 92 of the recessed part 81.

Figure 20:
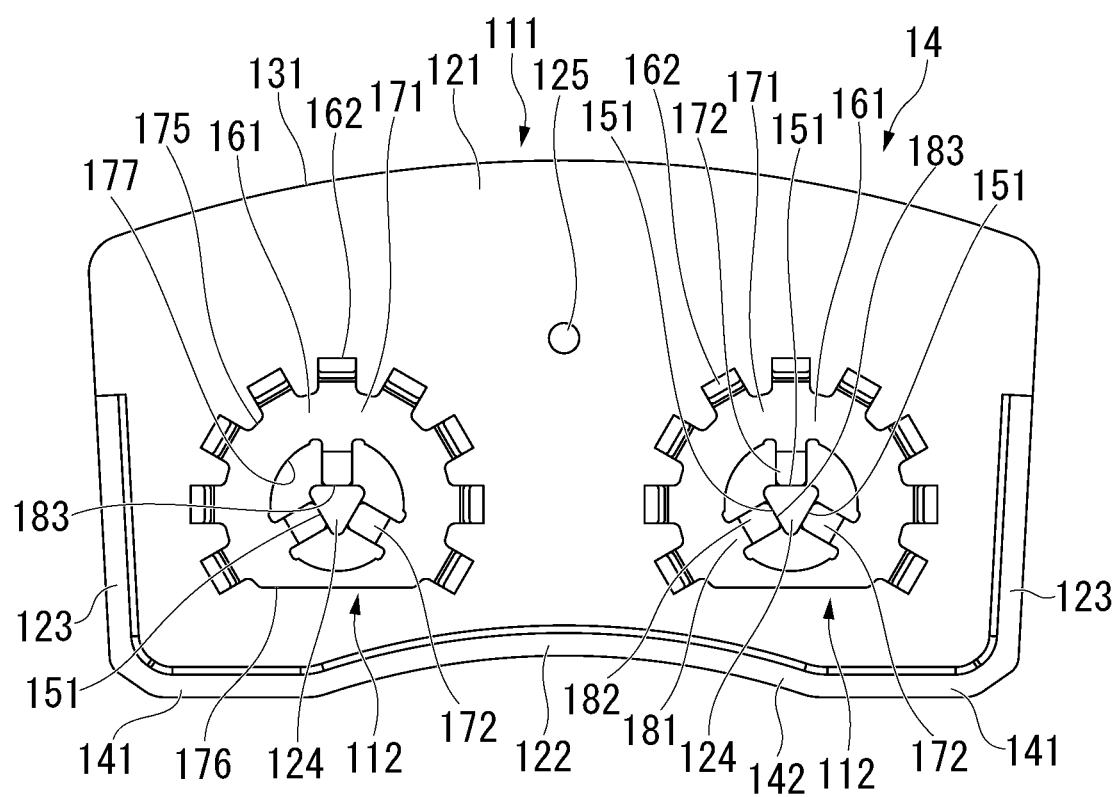
FIG. 20 is a rear view illustrating a cover component of the disc brake of the embodiment.

As illustrated in FIG. 20, the pair of locking members 112 are fitted and fixed to the pair of mounting parts 124 of the cover member 111. That is, one of the pair of locking members 112 is fitted to one mounting part 124 while elastically deforming the three fixing pieces 172 of the fixing part 161. At that time, the one locking member 112 has a posture in which the base plate part 171 is at the front in a fitting direction, and the linear edge part 176 is disposed on the inwardly bent part 122 side of the long side edge part 131 and the inwardly bent part 122 in the cover member 111 to be parallel to the end side plate part 141 of the inwardly bent part 122. Then, the one locking member 112 is fitted to the one mounting part 124 until the base plate part 171 is brought into contact with the main plate part 121. Then, the three distal end edge portions 183 are brought into line contact with the corresponding ones of the three side surfaces 151 of the one mounting part 124, and thereby the one locking member 112 is fixed to the cover member 111 by an elastic force of the three fixing pieces 172.

Also, the other of the pair of locking members 112 is fitted to the other mounting part 124 while elastically deforming the three fixing pieces 172 of the fixing part 161. At that time, the other locking member 112 has a posture in which the base plate part 171 is at the front in the fitting direction, and the linear edge part 176 is disposed on the inwardly bent part 122 side of the long side edge part 131 and the inwardly bent part 122 in the cover member 111 to be parallel to the end side plate part 141 of the inwardly bent part 122. Then, the other locking member 112 is fitted to the other mounting part 124 until the base plate part 171 is brought into contact with the main plate part 121. Then, the three distal end edge portions 183 are brought into line contact with the corresponding ones of the three side surfaces 151 of the other mounting part 124, and thereby the other locking member 112 is fixed to the cover member 111 by an elastic force of the three fixing pieces 172.

In this way, the pair of locking members 112 are fixed to the cover member 111 to form the cover component 14. In this state, two locking members 112 are disposed in the longitudinal direction of the cover member 111.

Figure 21:
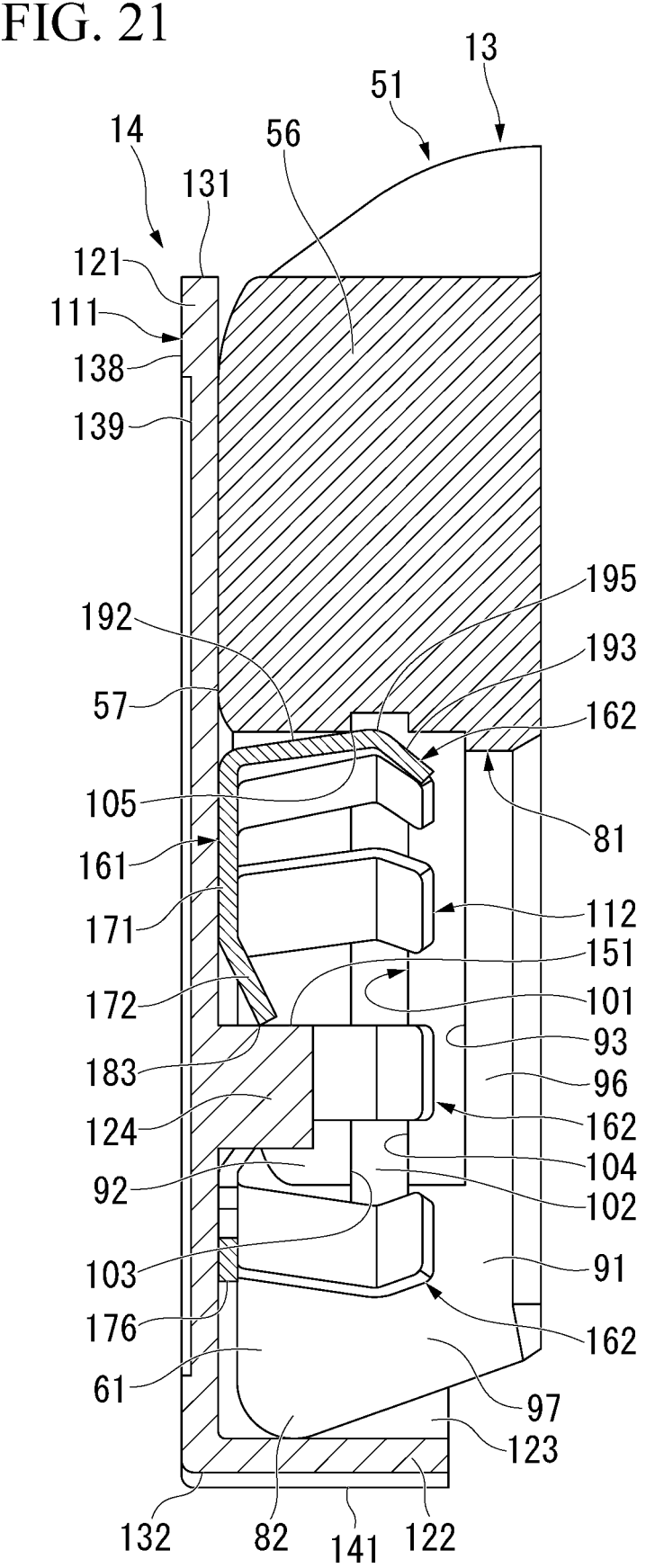
FIG. 21 is a partial cross-sectional view illustrating the caliper and the cover component of the disc brake of the embodiment along line XXI-XXI of FIG. 2.

Then, as illustrated in FIG. 21, the cover component 14 is assembled to the bridge part 56 and the reaction part 57 of the caliper body 51. At that time, the cover component 14 is assembled to the bridge part 56 and the reaction part 57 from a side opposite to the cylinder part 55 illustrated in FIG. 3 in the disc axial direction.

As illustrated in FIG. 21, when the cover component 14 is assembled to the bridge part 56 and the reaction part 57, the cover component 14 is fitted into the pair of recessed parts 81 at the pair of locking members 112 in a posture in which the pair of locking members 112 are at the front and the main plate part 121 of the cover member 111 is at the rear. Further, in this posture, the cover member 111 is in a state in which the inwardly bent part 122 and the pair of side surface bent parts 123 extend from the main plate part 121 in a direction toward the cylinder part 55.

In this state, when the pair of locking members 112 are fitted into the pair of recessed parts 81, one locking member 112 comes into contact with the end edge portion of the main inner surface part 92 of one recessed part 81 on a side opposite to the cylinder part 55 by the distal end plate parts 193 of the plurality of locking pieces 162. Also, the other locking member 112 also comes into contact with the end edge portion of the main inner surface part 92 of the other recessed part 81 on a side opposite to the cylinder part 55 by the distal end plate parts 193 of the plurality of locking pieces 162.

Further, when the fitting of the pair of locking members 112 further proceeds, the plurality of locking pieces 162 of one locking member 112 ride on the main inner surface part 92 of one recessed part 81 at the boundary parts 195 while being elastically deformed to the mounting part 124 side due to the inclination of the distal end plate part 193. Also, the plurality of locking pieces 162 of the other locking member 112 also ride on the main inner surface part 92 of the other recessed part 81 at the boundary parts 195 while being elastically deformed to the mounting part 124 side due to the inclination of the distal end plate part 193.

Figure 23:
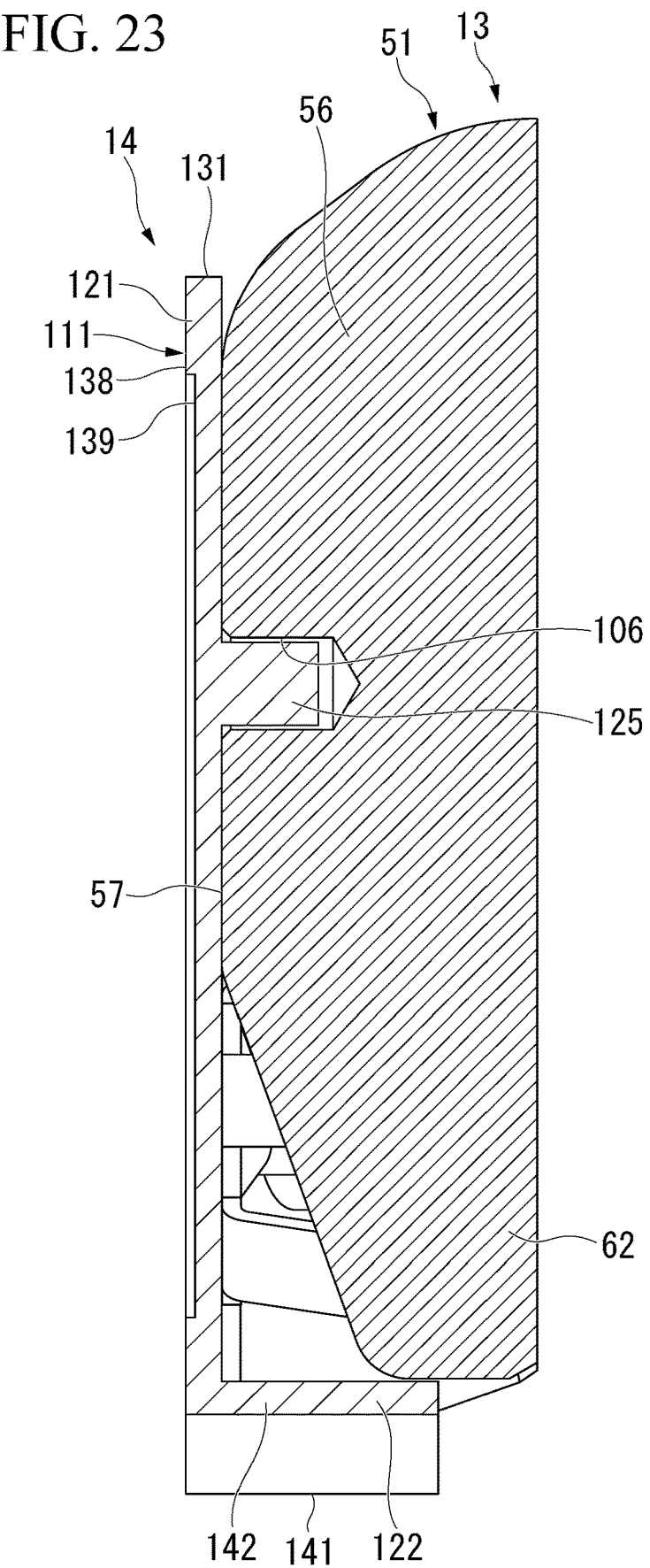
FIG. 23 is a partial cross-sectional view illustrating the caliper and the cover component of the disc brake of the embodiment along line XXIII-XXIII of FIG. 2.

Further, when the fitting of the pair of locking members 112 further proceeds, the boundary parts 195 of the plurality of locking pieces 162 in one locking member 112 reach a position of the locking groove 101. Therefore, these locking pieces 162 set back the elastic deformation a little, and the intermediate plate part 192 comes into contact with the end edge portion 105 of the wall surface 103 of the locking groove 101 on the main inner surface part 92 side. Similarly, the boundary parts 195 of the plurality of locking pieces 162 in the other locking member 112 reach a position of the locking groove 101. Therefore, these locking pieces 162 set back the elastic deformation a little, and the intermediate plate part 192 comes into contact with the end edge portion 105 of the wall surface 103 of the locking groove 101 on the main inner surface part 92 side. Finally, as illustrated in FIGS. 21 and 23, the cover component 14 comes into contact with the bridge part 56 and the reaction part 57 by the main plate part 121 and stops.

Figure 22:
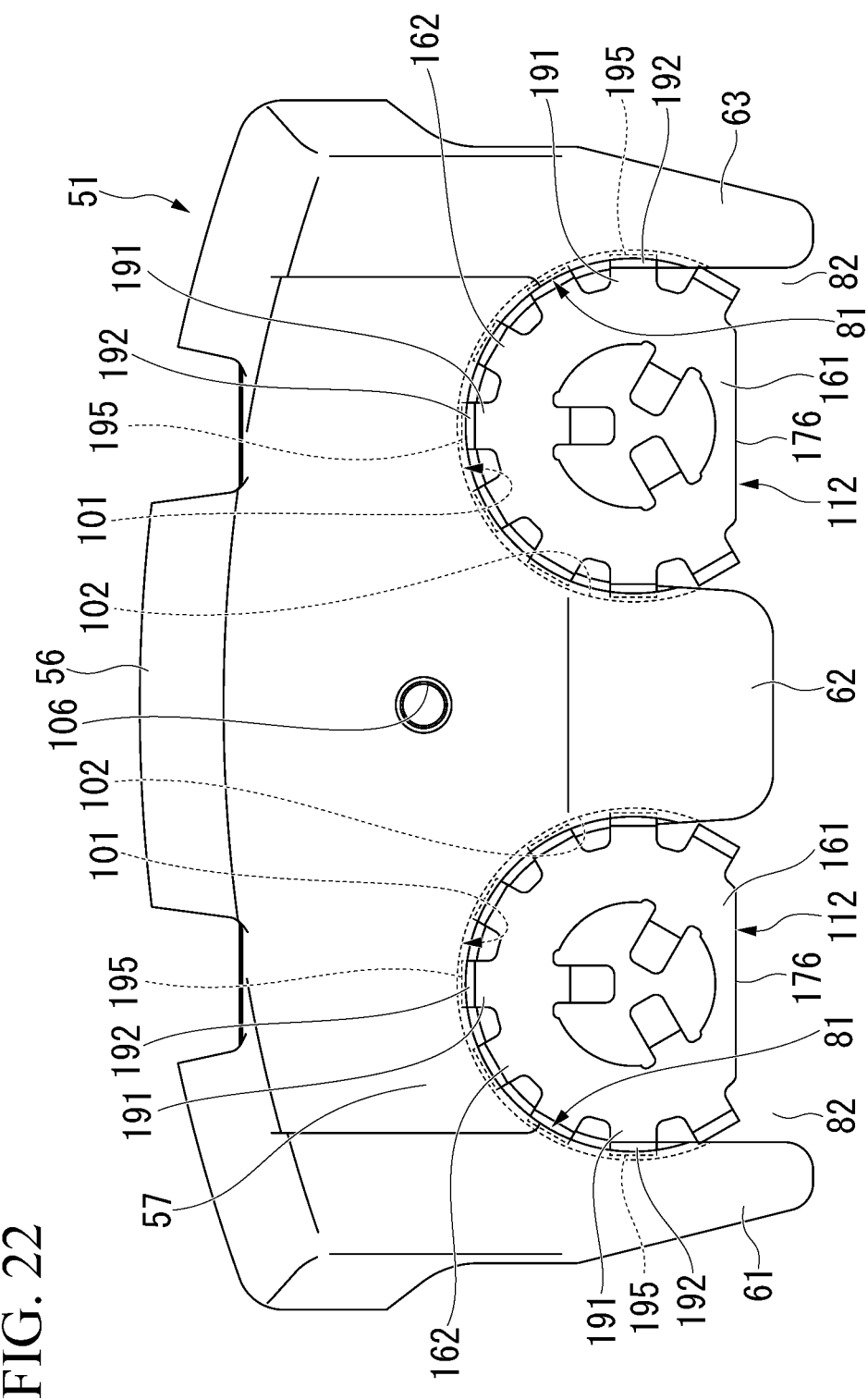
FIG. 22 is a partial front view illustrating the caliper body and the locking member of the disc brake of the embodiment.

In the cover component 14 attached to the caliper 13 in this way, as illustrated in FIGS. 21 and 22, the plurality of locking pieces 162 allow the boundary parts 195 to enter the locking groove 101 by an elastic force. As a result, as illustrated in FIG. 21, the intermediate plate parts 192 are maintained in a state of being in contact with the end edge portion 105 of the locking groove 101. Here, in the cover component 14, the intermediate plate parts 192 of the plurality of locking pieces 162 of one locking member 112 are inclined as a whole so that a diameter thereof becomes larger with distance away from the main plate part 121. Therefore, the elastic force of these locking pieces 162 generates a component in a direction in which the main plate part 121 is brought into contact with the bridge part 56 and the reaction part 57. Similarly, the elastic force of the plurality of locking pieces 162 of the other locking member 112 also generates a component in a direction in which the main plate part 121 is brought into contact with the bridge part 56 and the reaction part 57. As a result, the pair of locking members 112 bring the main plate part 121 of the cover member 111 into contact with the bridge part 56 and the reaction part 57 with an elastic force. At this time, a portion of the main plate part 121 on an outer side of the mounting parts 124 in the disc radial direction is brought into contact with the bridge part 56 and the reaction part 57.

In the cover component 14 attached to the caliper 13, the inwardly bent part 122 extending in a direction toward the cylinder part 55 from the long side edge part 132 on the disc radial direction inner side of the main plate part 121 of the cover member 111 covers the disc radial direction inner side of the pair of outer claw parts 61 and the intermediate claw part 62 of the reaction part 57, and thereby the openings 82 of the pair of recessed parts 81 are closed. Also, in the cover component 14 attached to the caliper 13, the pair of side surface bent parts 123 extending in a direction toward the cylinder part 55 from the pair of short side edge parts 133 on both sides in the disc rotation direction of the main plate part 121 of the cover member 111 cover both sides in the disc rotation direction of the pair of outer claw parts 61 of the reaction part 57, that is, the sides of the pair of outer claw parts 61 on a side opposite to the intermediate claw parts 62. In addition, the cover component 14 attached to the caliper 13 causes the fitting protruding part 125 to be fitted into the fitting recessed part 106 as illustrated in FIG. 23. Also, in the cover component 14 attached to the caliper 13, the pair of locking members 112 cause the linear edge parts 176 to be disposed in the openings 82 of the recessed parts 81 as illustrated in FIG. 22.

The cover component 14 in an assembled state to the caliper 13 as described above is configured such that the cover member 111 covers the recessed parts 81 from the outside opposite to the cylinder part 55 in the disc axial direction and from the disc radial direction inner side. That is, in the cover member 111, the main plate part 121 overlaps the pair of recessed parts 81 in positions in the disc rotation direction and the disc radial direction, and the inwardly bent part 122 overlaps the pair of recessed parts 81 in positions in the disc rotation direction and the disc axial direction. In this state, the locking members 112 of the cover component 14 fix the cover member 111 to the caliper 13.

Also, in the cover component 14 in an assembled state to the caliper 13, the locking member 112 is fixed to the cover member 111 at the fixing part 161. In this state, the plurality of locking pieces 162 of the locking member 112 in the cover component 14 extend from the fixing part 161 in an axial direction of the cylinder hole 71, in other words, in a direction inclined with respect to a movement direction of the piston 72. In this state, the plurality of locking pieces 162 of the locking member 112 in the cover component 14 come into contact with the inner surface 91 of the recessed part 81 with an elastic force. In this state, the plurality of locking pieces 162 of the cover component 14 come into contact with the locking groove 101 of the recessed part 81. In this state, in the cover component 14, the locking pieces 162 are provided at portions of the locking member 112 other than the opening 82 of the recessed part 81. Also, in the caliper 13 with the cover component 14 assembled, the locking member 112 is disposed in each of the two recessed parts 81.

In the cover component 14 in an assembled state to the caliper 13, the fitting protruding part 125 that fits into the fitting recessed part 106 of the caliper 13 in a concave-convex manner is provided on an outer side in the disc radial direction with respect to the mounting parts 124 to which the locking members 112 of the cover member 111 are fixed. Also, in this state, the cover component 14 includes the fitting protruding part 125 that fits into the fitting recessed part 106 of the caliper 13 in a concave-convex manner on an outer side of the mounting parts 124 in the disc radial direction at a central portion between the mounting parts 124 to which the locking members 112 of the cover member 111 are fixed. Further, the cover member 111 need only have a fitting part that fits to the caliper 13 in a concave-convex manner, and a fitting recessed part may be provided in the cover component 14 and a fitting protruding part may be provided in the reaction part 57 so that these may be fitted.

In the cover component 14 in an assembled state to the caliper 13, the cover member 111 comes into contact with the bridge part 56 on an outer side in the disc radial direction with respect to the mounting parts 124 to which the locking members 112 are fixed. In this state, the cover component 14 includes the inwardly bent part 122 that is bent in a direction toward the disc 11 from the end portion on the disc radial direction inner side in the cover member 111. In this state, the cover component 14 includes the pair of side surface bent parts 123 that are bent in a direction toward the disc 11 from the end portions in the disc rotation direction in the cover member 111.

In the disc brake 10, a working fluid is introduced into the piping hole 78 of the cylinder part 55 of the caliper 13 via a brake pipe (not illustrated). The working fluid is introduced into two cylinder holes 71 via the communication passage 77. Then, a brake hydraulic pressure acts on the piston 72 of the caliper 13 in each of the two cylinder holes 71. As a result, both pistons 72 move forward to the disc 11 side and press the inner side brake pad 17 of the pair of brake pads 17 disposed between the pistons 72 and the disc 11 toward the disc 11. Thereby, the brake pad 17 moves to be in contact with the disc 11. In other words, the pistons 72 that move one of the pair of brake pads 17 on the inner side are disposed in the cylinder holes 71 of the cylinder part 55.

Also, due to a reaction force of the pressing, the caliper body 51 slides the slide pins 47 with respect to the mounting member 12 and moves it in the disc axial direction. As a result, the reaction part 57 presses the outer brake pad 17 of the pair of brake pads 17 disposed between the reaction part 57 and the disc 11 toward the disc 11. Thereby, this brake pad 17 comes into contact with the disc 11.

In this way, the caliper 13 sandwiches the pair of brake pads 17 from both sides between the pistons 72 and the reaction part 57 and presses the brake pads 17 against both sides of the disc 11 by the operation of the plurality of pistons 72. As a result, the caliper 13 applies frictional resistance to the disc 11 to generate a braking force. The caliper 13 is a floating type caliper and a first type caliper.

Incidentally, in the disc brake described in Patent Literature 1, a cover component is mounted on a portion of the caliper that is visible from the outside of the vehicle. It is desired to facilitate assembly of such a cover component to the caliper.

The disc brake 10 and the cover component 14 of the present embodiment include the cover member 111 that covers the recessed parts 81, and the locking members 112 that are members different from the cover member 111 and configured to fix the cover member 111 to the caliper 13. The locking members 112 each include the fixing part 161 that is fixed to the cover member 111, and the plurality of locking pieces 162 extending from the fixing part 161 in a direction inclined with respect to the movement direction of the piston 72 to come into contact with the inner surface 91 of the recessed part 81 of the caliper 13 with an elastic force. When such a structure in which the plurality of locking pieces 162 having an inclination are brought into contact with the inner surface 91 of the recessed part 81 is employed, a spring constant of the plurality of locking pieces 162 can be reduced. Therefore, a force required to bring the plurality of locking pieces 162 of the locking member 112 into contact with the inner surface 91 of the recessed part 81 of the caliper 13 with an elastic force is small. Therefore, assembly of the cover component 14 to the caliper 13 is facilitated.

Also, the cover component 14 includes the cover member 111 that covers the recessed parts 81, and the locking members 112 that are members different from the cover member 111 and configured to fix the cover member 111 to the caliper 13. Therefore, a degree of freedom in each shape increases. Therefore, assembly to the caliper 13 is facilitated, and furthermore, a design, productivity, durability, and the like of the cover component 14 can be improved.

Also, the locking members 112 each include the plurality of locking pieces 162 extending in a direction inclined with respect to the movement direction of the piston 72 from the fixing part 161 that is fixed to the cover member 111 and coming into contact with the inner surface 91 of the recessed part 81 of the caliper 13 with an elastic force. Therefore, the cover member 111 can be brought into close contact with the bridge part 56 and the reaction part 57 with an elastic force.

Also, the locking groove 101 having an arc shape as a whole is provided along the inner surface 91 of the recessed part 81 in the caliper 13, and the locking pieces 162 of the locking member 112 come into contact with the locking groove 101. Therefore, disengagement of the locking member 112 from the caliper 13 can be curbed.

Also, the locking groove 101 has a distance between both end portions on the opening 82 side of the recessed part 81 smaller than a diameter thereof. Therefore, disengagement of the locking member 112 from the caliper 13 can be further curbed.

Also, since the locking member 112 includes three or more locking pieces 162, disengagement of the cover component 14 from the caliper 13 can be curbed.

Also, the locking pieces 162 are provided in the locking member 112 at portions other than the opening 82 of the recessed part 81. Therefore, the locking pieces 162 at a portion that is not necessary for attaching the cover component 14 to the caliper 13 can be eliminated. Therefore, weight reduction of the locking member 112 and the cover component 14 including the locking member 112 can be achieved.

Also, the caliper 13 includes two recessed parts 81, and each of the locking member 112 is disposed in respective one of the recessed parts 81. Therefore, disengagement of the cover component 14 from the caliper 13 can be curbed. In addition, rotation of the cover component 14 with respect to the caliper 13 can be restricted.

Also, the fitting protruding part 125 that fits into the caliper 13 in a concave-convex manner is provided in the cover member 111 on an outer side in the disc radial direction with respect to the mounting parts 124 to which the locking members 112 are fixed. Therefore, disengagement of the cover component 14 from the caliper 13 can be curbed.

Also, the fitting protruding part 125 that fits into the caliper 13 in a concave-convex manner is provided in the cover member 111 on an outer side of the mounting parts 124 in the disc radial direction at a central portion between the mounting parts 124 to each of which respective one of the locking members 112 is fixed. Therefore, disengagement of the cover component 14 from the caliper 13 can be curbed. For example, even when one of the locking members 112 is disengaged from the caliper 13, an elastic force is generated between the fixing part 161 of the locking member 112 on the opposite side and the fitting protruding part 125 that fits into the caliper 13 in a concave-convex manner on an outer side in the radial direction. Thereby, the cover member 111 can be inhibited from falling off the caliper 13.

Also, the cover member 111 comes into contact with the bridge part 56 on an outer side in the disc radial direction with respect to the mounting parts 124 to which the locking members 112 are fixed. Therefore, a fixed state of the cover component 14 to the caliper 13 can be stabilized.

Also, the cover member 111 includes the inwardly bent part 122 that is bent in a direction toward the disc 11 from the long side edge part 132 of the end portion on the disc radial direction inner side. Therefore, earth or snow does not easily enter the inside of the caliper 13. In addition, wind noise generated by the wind passing through a gap between the cover member 111 and the caliper 13 can also be suppressed, and a feeling of discomfort given to a driver can be suppressed.

Further, the cover member 111 includes the side surface bent parts 123 that are bent in a direction toward the disc 11 from the pair of end side edge parts 136 of the end portions in the disc rotation direction. Therefore, earth or snow does not easily enter the inside of the caliper 13. In addition, wind noise generated by the wind passing through a gap between the cover member 111 and the caliper 13 can also be suppressed, and a feeling of discomfort given to a driver can be suppressed.

The gist of the present embodiment described above will be summarized below.

A first aspect is a disc brake braking a vehicle having a disc that rotates together with a wheel and including a mounting member mounted on a non-rotating portion of the vehicle, a pair of brake pads, a caliper provided on the mounting member to be movable and configured to press the pair of brake pads against the disc, a cover member covering a recessed part of the caliper, and a locking member provided separately from the cover member and configured to fix the cover member to the caliper, in which the caliper includes a cylinder part having a cylinder hole in which a piston for moving one of the pair of brake pads is disposed, a bridge part extending across an outer circumferential surface of the disc from the cylinder part, a plurality of claw parts formed on an extended distal end side of the bridge part and disposed to face the cylinder part, and the recessed part provided between the plurality of claw parts, having an opening at a disc radial direction inner end, and formed to face the cylinder hole, and the locking member includes a fixing part fixed to the cover member, and a plurality of locking pieces extending from the fixing part in a direction inclined with respect to a movement direction of the piston to come into contact with an inner surface of the recessed part with an elastic force.

According to this configuration, assembly of the cover component to the caliper is facilitated.

According to the disc brake of a second aspect, in the first aspect, a locking groove having an arc shape as a whole is provided along the inner surface of the recessed part, and the locking pieces come into contact with the locking groove.

According to the disc brake of a third aspect, in the second aspect, a distance between both end portions of the locking groove on the opening side of the recessed part is smaller than a diameter of the locking groove.

According to the disc brake of a fourth aspect, in the first aspect, three or more locking pieces are provided in the locking member.

According to the disc brake of a fifth aspect, in the fourth aspect, the locking pieces are provided in the locking member at portions other than the opening of the recessed part.

According to the disc brake of a sixth aspect, in the first aspect, two recessed parts are provided in the caliper, and the locking member is disposed in each of the recessed parts.

According to the disc brake of a seventh aspect, in the sixth aspect, a fitting part which fits into the caliper in a concave-convex manner is provided in the cover member on an outer side in a disc radial direction with respect to mounting parts to which the locking members are fixed.

According to the disc brake of an eighth aspect, in the sixth aspect, a fitting part which fits into the caliper in a concave-convex manner is provided in the cover member on an outer side of mounting parts in a disc radial direction at a central portion between the mounting parts to each of which respective one of the locking members is fixed.

According to the disc brake of a ninth aspect, in the first aspect, a fitting part which fits into the caliper in a concave-convex manner is provided in the cover member on an outer side in a disc radial direction with respect to a mounting part to which the locking member is fixed.

According to the disc brake of a tenth aspect, in the first aspect, the cover member comes into contact with the bridge part on an outer side in a disc radial direction with respect to a mounting part to which the locking member is fixed.

According to the disc brake of an eleventh aspect, in the first aspect, the cover member includes an inwardly bent part which is bent in a direction toward the disc from an end portion on a disc radial direction inner side.

According to the disc brake of a twelfth aspect, in the first aspect, the cover member includes a side surface bent part which is bent in a direction toward the disc from an end portion in a disc rotation direction.

A thirteenth aspect is a cover component constituting a disc brake which includes a mounting member mounted on a non-rotating portion of a vehicle having a wheel and a disc which rotates with the wheel, a pair of brake pads, and a caliper provided on the mounting member to be movable and configured to press the pair of brake pads against the disc, in which the caliper includes a cylinder part having a cylinder hole in which a piston for moving one of the pair of brake pads is disposed, a bridge part extending across an outer circumferential surface of the disc from the cylinder part, a plurality of claw parts formed on an extended distal end side of the bridge part and disposed to face the cylinder part, and a recessed part provided between the plurality of claw parts, having an opening at a disc radial direction inner end, and formed to face the cylinder hole, and the cover component includes a cover member covering the recessed part, and a locking member provided separately from the cover member and configured to fix the cover member to the caliper, in which the locking member includes a fixing part fixed to the cover member, and a plurality of locking pieces extending from the fixing part in a direction inclined with respect to a movement direction of the piston to come into contact with an inner surface of the recessed part with an elastic force. According to this configuration, assembly to the caliper is facilitated.

According to the cover component of a fourteenth aspect, in the thirteenth aspect, two locking members are disposed in a longitudinal direction of the cover member.

According to the cover component of a fifteenth aspect, in the fourteenth aspect, a fitting part which fits into the caliper in a concave-convex manner is provided in the cover member on an outer side in a disc radial direction with respect to mounting parts to which the locking members are fixed.

According to the cover component of a sixteenth aspect, in the fourteenth aspect, a fitting part which fits into the caliper in a concave-convex manner is provided in the cover member on an outer side of mounting parts in a disc radial direction at a central portion between the mounting parts to each of which respective one of the locking members is fixed.

According to the cover component of a seventeenth aspect, in the thirteenth aspect, three or more locking pieces are provided in the locking member.

According to the cover component of an eighteenth aspect, in the seventeenth aspect, the locking pieces are provided in the locking member at portions other than the opening of the recessed part.

According to the cover component of a nineteenth aspect, in the thirteenth aspect, the cover member includes an inwardly bent part which is bent in a direction toward the disc from an end portion on a disc radial direction inner side.

According to the cover component of a twentieth aspect, in the thirteenth aspect, the cover member includes a side surface bent part which is bent in a direction toward the disc from an end portion in a disc rotation direction.

INDUSTRIAL APPLICABILITY

According to the present invention, it is possible to provide a disc brake and a cover component in which assembly of the cover component to a caliper is facilitated.

REFERENCE SIGNS LIST

10 Disc brake
11 Disc
12 Mounting member
13 Caliper
14 Cover component
17 Brake pad
55 Cylinder part
56 Bridge part
61 Outer claw part (claw part)
62 Intermediate claw part (claw part)
71 Cylinder hole
72 Piston
81 Recessed part
82 Opening
91 Inner surface
101 Locking groove
111 Cover member
112 Locking member
122 Inwardly bent part
123 Side surface bent part
124 Mounting part
125 Fitting protruding part (fitting part)
161 Fixing part
162 Locking piece

The invention claimed is:

1. A disc brake which is a disc brake braking a vehicle having a disc rotating together with a wheel, the disc brake comprising:
 a mounting member mounted on a non-rotating portion of the vehicle;
 a pair of brake pads;
 a caliper provided on the mounting member to be movable and configured to press the pair of brake pads against the disc;
 a cover member covering a recessed part of the caliper; and
 a locking member provided separately from the cover member and configured to fix the cover member to the caliper, wherein
 the caliper includes:
 a cylinder part having a cylinder hole in which a piston for moving one of the pair of brake pads is disposed;
 a bridge part extending across an outer circumferential surface of the disc from the cylinder part;
 a plurality of claw parts formed on an extended distal end side of the bridge part and disposed to face the cylinder part; and
 the recessed part provided between the plurality of claw parts, having an opening at a disc radial direction inner end, and formed to face the cylinder hole, and
 the locking member includes:
 a fixing part fixed to the cover member; and
 a plurality of locking pieces extending from the fixing part in a direction inclined with respect to a movement direction of the piston to come into contact with an inner surface of the recessed part with an elastic force.

2. The disc brake according to claim 1, wherein a locking groove having an arc shape as a whole is provided along the inner surface of the recessed part, and the locking pieces come into contact with the locking groove.

3. The disc brake according to claim 2, wherein a distance between both end portions of the locking groove on the opening side of the recessed part is smaller than a diameter of the locking groove.

4. The disc brake according to claim 1, wherein three or more locking pieces are provided in the locking member.

5. The disc brake according to claim 4, wherein the locking pieces are provided in the locking member at portions other than the opening of the recessed part.

6. The disc brake according to claim 1, wherein two recessed parts are provided in the caliper, and the locking member is disposed in each of the recessed parts.

7. The disc brake according to claim 6, wherein a fitting part which fits into the caliper in a concave-convex manner is provided in the cover member on an outer side in a disc radial direction with respect to mounting parts to each of which respective one of the locking members is fixed.

8. The disc brake according to claim 6, wherein a fitting part which fits into the caliper in a concave-convex manner is provided in the cover member on an outer side of mounting parts in a disc radial direction at a central portion between the mounting parts to each of which respective one of the locking members is fixed.

9. The disc brake according to claim 1, wherein a fitting part which fits into the caliper in a concave-convex manner is provided in the cover member on an outer side in a disc radial direction with respect to a mounting part to which the locking member is fixed.

10. The disc brake according to claim 1, wherein the cover member comes into contact with the bridge part on an outer side in a disc radial direction with respect to a mounting part to which the locking member is fixed.

11. The disc brake according to claim 1, wherein the cover member includes an inwardly bent part which is bent in a direction toward the disc from an end portion on a disc radial direction inner side.

12. The disc brake according to claim 1, wherein the cover member includes a side surface bent part which is bent in a direction toward the disc from an end portion in a disc rotation direction.

13. A cover component which is a cover component constituting a disc brake which includes:
 a mounting member mounted on a non-rotating portion of a vehicle having a wheel and a disc which rotates with the wheel;
 a pair of brake pads; and
 a caliper provided on the mounting member to be movable and configured to press the pair of brake pads against the disc, in which
 the caliper includes:
 a cylinder part having a cylinder hole in which a piston for moving one of the pair of brake pads is disposed;
 a bridge part extending across an outer circumferential surface of the disc from the cylinder part;
 a plurality of claw parts formed on an extended distal end side of the bridge part and disposed to face the cylinder part; and
 a recessed part provided between the plurality of claw parts, having an opening at a disc radial direction inner end, and formed to face the cylinder hole,
 the cover component comprising:
 a cover member covering the recessed part; and
 a locking member provided separately from the cover member and configured to fix the cover member to the caliper, wherein the locking member includes:
a fixing part fixed to the cover member; and
a plurality of locking pieces extending from the fixing part in a direction inclined with respect to a movement direction of the piston to come into contact with an inner surface of the recessed part with an elastic force.

14. The cover component according to claim 13, wherein two locking members are disposed in a longitudinal direction of the cover member.

15. The cover component according to claim 14, wherein a fitting part which fits into the caliper in a concave-convex manner is provided in the cover member on an outer side in a disc radial direction with respect to mounting parts to each of which respective one of the locking members is fixed.

16. The cover component according to claim 14, wherein a fitting part which fits into the caliper in a concave-convex manner is provided in the cover member on an outer side of mounting parts in a disc radial direction at a central portion between the mounting parts to each of which respective one of the locking members is fixed.

17. The cover component according to claim 13, wherein three or more locking pieces are provided in the locking member.

18. The cover component according to claim 17, wherein the locking pieces are provided in the locking member at portions other than the opening of the recessed part.

19. The cover component according to claim 13, wherein the cover member includes an inwardly bent part which is bent in a direction toward the disc from an end portion on a disc radial direction inner side.

20. The cover component according to claim 13, wherein the cover member includes a side surface bent part which is bent in a direction toward the disc from an end portion in a disc rotation direction.

* * * * *